(12) United States Patent
Yabuta et al.

(10) Patent No.: US 7,873,750 B2
(45) Date of Patent: Jan. 18, 2011

(54) SERVER SYSTEM HAVING I/O INTERFACE UNIT

(75) Inventors: Keizo Yabuta, Yokohama (JP);
Hidekazu Itsuki, Yokohama (JP);
Kazutoshi Abe, Hiratsuka (JP);
Masaaki Higuchi, Ebina (JP)

(73) Assignee: Hitachi, Ltd., Tokyo (JP)

( * ) Notice: Subject to any disclaimer, the term of this patent is extended or adjusted under 35 U.S.C. 154(b) by 1311 days.

(21) Appl. No.: 10/853,335

(22) Filed: May 26, 2004

(65) Prior Publication Data
US 2005/0015531 A1 Jan. 20, 2005

(30) Foreign Application Priority Data
May 29, 2003 (JP) ............................. 2003-152593

(51) Int. Cl.
*G06F 15/16* (2006.01)
(52) U.S. Cl. ....................................... 709/250; 709/253
(58) Field of Classification Search ................. 709/225, 709/229, 250; 710/100, 310
See application file for complete search history.

(56) References Cited

U.S. PATENT DOCUMENTS

| | | | | | |
|---|---|---|---|---|---|
| 5,122,691 | A | * | 6/1992 | Balakrishnan | ................ 326/86 |
| 5,296,748 | A | * | 3/1994 | Wicklund et al. | ............ 327/565 |
| 6,108,725 | A | * | 8/2000 | Chatter | ......................... 710/56 |
| 7,065,599 | B2 | * | 6/2006 | King et al. | ................... 710/301 |
| 2003/0030978 | A1 | * | 2/2003 | Garnett et al. | .............. 361/687 |
| 2003/0033366 | A1 | * | 2/2003 | Garnett et al. | ............... 709/203 |
| 2003/0033409 | A1 | * | 2/2003 | King et al. | .................... 709/225 |
| 2003/0033463 | A1 | * | 2/2003 | Garnett et al. | ............... 710/300 |
| 2003/0101304 | A1 | * | 5/2003 | King et al. | .................... 710/301 |
| 2004/0172494 | A1 | * | 9/2004 | Pettey et al. | ................. 710/305 |
| 2004/0189161 | A1 | * | 9/2004 | Davis et al. | .............. 312/265.3 |
| 2004/0205270 | A1 | * | 10/2004 | Creta et al. | .................. 710/100 |

FOREIGN PATENT DOCUMENTS

| | | |
|---|---|---|
| JP | 10-161973 | 6/1998 |
| JP | 11-202976 A | 7/1999 |
| JP | 11-225171 | 8/1999 |
| JP | 11-305875 A | 11/1999 |
| JP | 11-312854 | 11/1999 |
| JP | 11-327688 A | 11/1999 |
| JP | 2002-057419 | 2/2002 |
| JP | 2005-524884 | 8/2005 |

OTHER PUBLICATIONS

"Blade Server", IDG Japan, Monthly Network World, Jun. 2003, pp. 134-148, Test Center Report, vol. 7.
"Is a Blade Server Usable in Enterprises? Advantages in VLAN Configuration, Management, or Performance Upgrade with a Built-in Switch", Nikkei BP Co., Nikkei Communication, Mar. 3, 2003, p. 62.

(Continued)

*Primary Examiner*—Benjamin R Bruckart
*Assistant Examiner*—Gerald Smarth
(74) *Attorney, Agent, or Firm*—Mattingly & Malur, P.C.

(57) ABSTRACT

A disclosed server system has a processor blade in which a processor is mounted and an interface unit that is connected to an external device, and a serial interface connects between these units. Multiple serial interfaces are bundled to enable expansion of a band. The processor blade and the interface unit connect fellow connectors back to back.

27 Claims, 17 Drawing Sheets

OTHER PUBLICATIONS

K. Sato, "Storage for large-scale-sized data, Introduction of fiberchannel SAN", Open Design, vol. 10, No. 1, Jan. 1, 2003, pp. 81-88 vol. 10, JP CQ Publishing Co., Ltd.

Personal Computer Technical Lecture, Application Section 2nd Time, "The present and the future of a bus, PCI Express, Serial ATA", Nikkei Personal Computing No. 416, Sep. 2, 2002, pp. 193-196, Nikkei Business Publications, Inc.

* cited by examiner

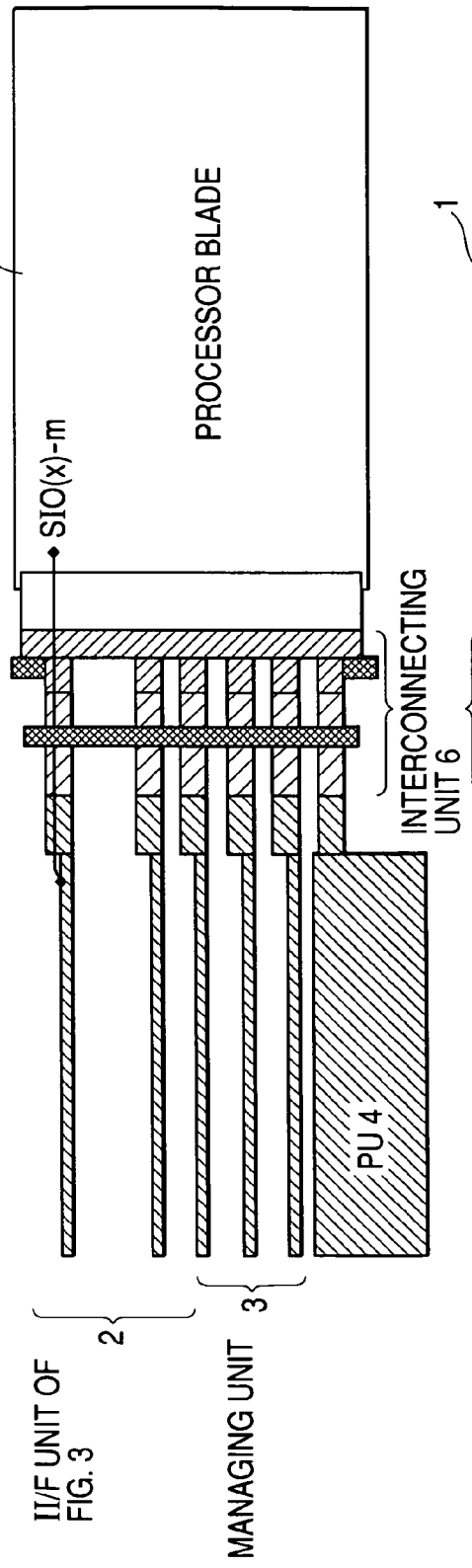

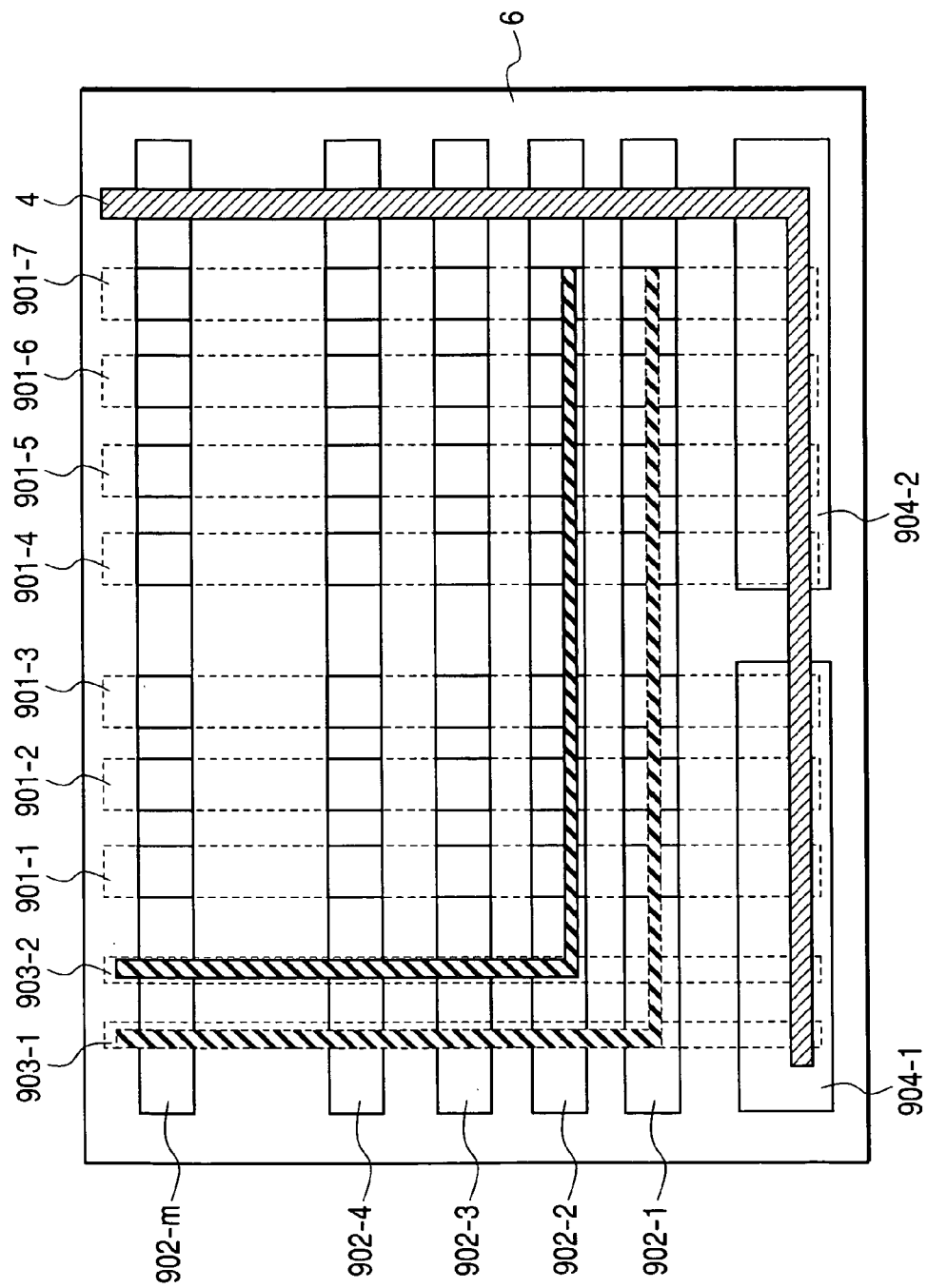

SERVER SYSTEM HAVING I/O INTERFACE UNIT

BACKGROUND OF THE INVENTION

The present invention relates to a server system, and, more particularly to a blade server that mounts multiple servers in a common enclosure in high density.

In recent years, the application of the Internet to various businesses is expanding rapidly. Accordingly, even a server system that constructs the Internet environment changes in form and supports an expanding growth of the Internet. A blade server has appeared as one of the changes to advance the high-density packaging of a server. The "blade" of the blade server is a long, thin sword-type circuit board having hardware and software for functioning as the server. The blade server realizes the high-density packaging by mounting multiple blades in an enclosure.

A blade server has typically a blade that mounts a CPU (processor), an external interface unit, a controller, a cooling system, and a power unit. The blade mounts the processor for operating as a server, and processes various information in accordance with user applications. The external interface connects the blade to a network, such as the Internet or a LAN. The controller monitors, controls, and sets the operation inside the server. The cooling system cools equipment by air cooling or liquid cooling, or the combination of these coolings. The power unit supplies the power necessary for these units. Each of these units is mounted in an enclosure. The enclosure, usually, uses mainly a standard rack of 19 inches wide in the same manner as a conventional server product. 44.5 mm high is specified as a unit (U), and the enclosure is manufactured in the height multiplied by an integer in accordance with functional performance.

Blades are mounted so that the number of blades which is necessary for users, meets the cooling performance or packaging density of an enclosure, and that the number does not exceed the number of mountable blades. These multiple blades operate individually or by scattering work. Further, a device, such as a processor, an HDD, or a memory, mounted in a blade is selected in accordance with the performance or reliability required from the view point of design. Accordingly, as the device turns into a high performance device, the size of ablaze increases. Consequently, even the enclosure must have the height equal to the size of this blade.

An interface unit is connected to multiple blades respectively, and connects between these blades and the external environment, such as the Internet or a LAN. The wiring between the interface and the blade is performed inside an enclosure using a PC board. TCP/IP or Ethernet (registered mark) is mostly used as a wired internal interface and terminated on the blade side. Further, it has at least two internal interfaces or more every blade, and enables redundant configuration or configuration in which multiple blades are simultaneously connected to a separated network. A physical interface with the Internet or LAN is made fewer than the number of blades and reduces the number of connecting cables of a server by concentrating and distributing a communication signal with a switch. Further, users can save the wiring work of a network cable connected individually every server. Most physical interfaces with the Internet or LAN use Ethernet.

A blade server has multiple blades as a server function, and an interface, a controller, a cooling system, and a power unit as common components. Accordingly, if any of these common components breaks down, multiple servers stop their operation at a time. Usually, the two respective common components or more can be mounted in an enclosure.

In regard to each component inside a blade server, as described above, multiple blades are mounted and each blade functions independently, and even a common component operates independently or has redundant configuration. Accordingly, a prerequisite is that each component is maintained individually while the component is being used. For maintenance, both-sided maintenance is enabled from the enclosure front and back sides. For example, mostly, a blade is mounted on the front side and the common component is mounted on the back side. Accordingly, the wiring between the blade and the common component is performed at the central part that separates the front and back sides.

Products having such configuration as described above are manufactured in each company, and introduced in magazines. Such examples are disclosed in the following documents. IDG Japan, Monthly Network World, Issue on June 2003, pp. 134 to 148, Test Center Report, Vol. 7, "Blade Server", and Nikkei BP Co, Nikkei Communication, Issue of Mar. 3, 2003, p. 62, "Is a Blade Server Usable in Enterprises? Advantages in VLAN Configuration, Management, or Performance Upgrade with a Built-in Switch", Japanese Patent Laid-Open No. 2002-057419, and U.S. Pat. No. 5,122,691. For example, Japanese Patent Laid-Open No. H11(1999)-312854 as a method of both-sided mounting of a blade server on the front and back sides characteristic of the Blade Server Mounting Method described in Background of the Invention.

SUMMARY OF THE INVENTION

A blade server can save space by high-density packaging, but has the following points to be improved.

A server function is diversified, and differs in the performance and functions necessary for equipment depending on its application. Accordingly, users purchase server equipment and optional products in accordance with their application and construct necessary configuration. Because costs become expensive if the server equipment is composed of high-performance equipment and equipment having various functions, it must have the configuration suitable to each application. Even a blade server lines up optional equipment, such as a memory or a disk, in a blade, and even a common component arranges a menu in the number of mounted components or in performance and functions.

On the other hand, because the origin of a blade server aims at high-density packaging and space saving, the blade server has a compact mounting design and is limited in optional user space. Accordingly, even if many blades are accommodated in an enclosure, the blade server is hard to make the performance of each blade differ greatly. Consequently, except when many servers having the performance on the same level are required, the blade servers are hard to exhibit their advantages. For example, a server system is layered and classified into a front-end server that can match comparatively low performance, such as a Web server, a mid-tier server, such as an application server that requires high performance, and a back-end server, such as a database server according to an application. Under the aforementioned circumstances, however, multiple blades inside the blade server are hard to obtain the configuration used in the application every separate layer respectively.

The network function of a common component is also hard to use effectively according to an application. The common component differs in a necessary interface band and the number of interfaces according to the application. For example, a network storage interface that requires a comparatively high band and the Internet or a LAN interface differs in the necessary band and the number of interfaces. However, since the addition or reduction of the interface band between a blade and an interface unit and the number of interfaces is difficult, a measure is not taken easily according to the application.

For example, a printed wiring board mounting structure in which a printed wiring board unit mounted on the front side of a back panel 51 and a printed wiring board unit mounted on the back side intersect is disclosed in Japanese Patent Laid-Open No. H11(1999)-312854. Further, the connector in an intersecting part is a press-fit pin that penetrates into a through hole of a back panel, and the printed wiring boards on the front and back sides connect via this press-fit pin.

When the number of signals between boards increases due to functional expansion, the area of an intersecting part must be widened because of an increasing common press-fit pin, and, by the same token, a new panel must be designed. Thus, a conventional blade server should be improved to meet the requirements of various blade applications.

Further, a new device is difficult to coexist with an old device. Nowadays, a technical progress is rapid, and the new device appears sequentially. As a result, server and network technologies are changing rapidly. Users incorporate equipment to which these new technologies apply, and, at the same time, must make effective use of the equipment used up to this date. Accordingly, even if the old device coexists with the new device, usable upper compatibility is an important element of the new device. In the configuration of a conventional blade server, however, a blade is accommodated in a dedicated enclosure that corresponds to the function and size of the blade and functions together with a special-purpose common component. Hence, the enclosure and common component of the old device cannot be used in the new device whose performance was upgraded. Accordingly, the blade server that accommodates many blades becomes a big obstacle to the installation of the new device.

To realize the high-density packaging of a blade server, the blade server is difficult to mount a large capacity disk or a RAID, and therefore, mostly, makes good use of a network storage. As described previously, in the blade, the protocol processing of layer 3 or higher, such as TCP/IP, and an Ethernet interface are terminated, and a processor mounted in the blade performs the protocol processing of a TCP/IP network. Accordingly, if an application whose network processing load is high, such as the network storage, is used, the processor throughput is suppressed.

Further, because a blade server realizes high-density packaging, the cooling of equipment is important. Air cooling is mostly used as a cooling method. In this case, desirably, fan air should flow inside an enclosure without an obstacle as much as possible. However, since the blade server uses a PC board to mount a blade and a common component on the front and back sides respectively and connects the blade and the common component to the central part, a flow of air is interrupted.

The following description relates to the configuration and packaging technology of a server device (blade server) in which the problems of the aforementioned prior art were dissolved.

Another aspect of the description relates to the configuration and packaging technology of a server device excellent in measures taken for the various applications of a blade unit.

Another aspect of the description relates to the configuration and packaging technology of a server device excellent in usable upper compatibility even if an old device coexists with a new device.

Another aspect of the description relates to the configuration and packaging technology of a server device that easily handles even an application whose network processing load is high, such as a network storage.

Another aspect of the description relates to the configuration and packaging technology of an air cooling type server device that can amply cool high-density packaged equipment.

The server system disclosed below has a processor blade that mounts a processor and an interface unit connected externally, and a serial interface connects the processor blade and the interface unit. The server system has the processor blade that mounts the processor and the interface unit that is connected externally, and the processor blade and the interface unit connect fellow connectors back to back.

Otherwise, the server system disclosed below has a processor blade that mounts a processor, an interface connected externally, and a connector unit that connects the processor blade and the interface unit. Further, the connector unit installs a first connector that mounts the processor blade on one side, and installs a second connector that mounts the interface unit on the other side. The arrangement of the first connector intersects with the arrangement of the second connector.

Additional objects, advantages and novel features of the examples will be set forth in part in the description which follows, and in part will become apparent to those skilled in the art upon examination of the following and the accompanying drawings or may be learned by production or operation of the examples. The objects and advantages of the inventive concepts may be realized and attained by means of the methodologies, instrumentalities and combinations particularly pointed out in the appended claims.

BRIEF DESCRIPTION OF THE DRAWINGS

The drawing figures depict one or more implementations in accord with the present concepts, by way of example only, not by way of limitations. In the figures, like reference numerals refer to the same or similar elements.

FIGS. 12A to 12C show a configuration of the interconnecting unit, based on signal wiring, in which FIG. 12A shows a front side unit 1001 of the interconnecting unit 6;

FIG. 12B shows aback side unit 1002 of the interconnecting unit 6; and

FIG. 12C is an enlarged view of the connector part of the front and back side units.

FIGS. 13A and 13B show a cross-sectional configuration viewed from side face in which the front side unit and the back side unit of the interconnecting unit are connected.

FIG. 15 is a drawing showing an example of the expansion of the blade server.

DETAILED DESCRIPTION OF PREFERRED EMBODIMENTS

Figure 1:
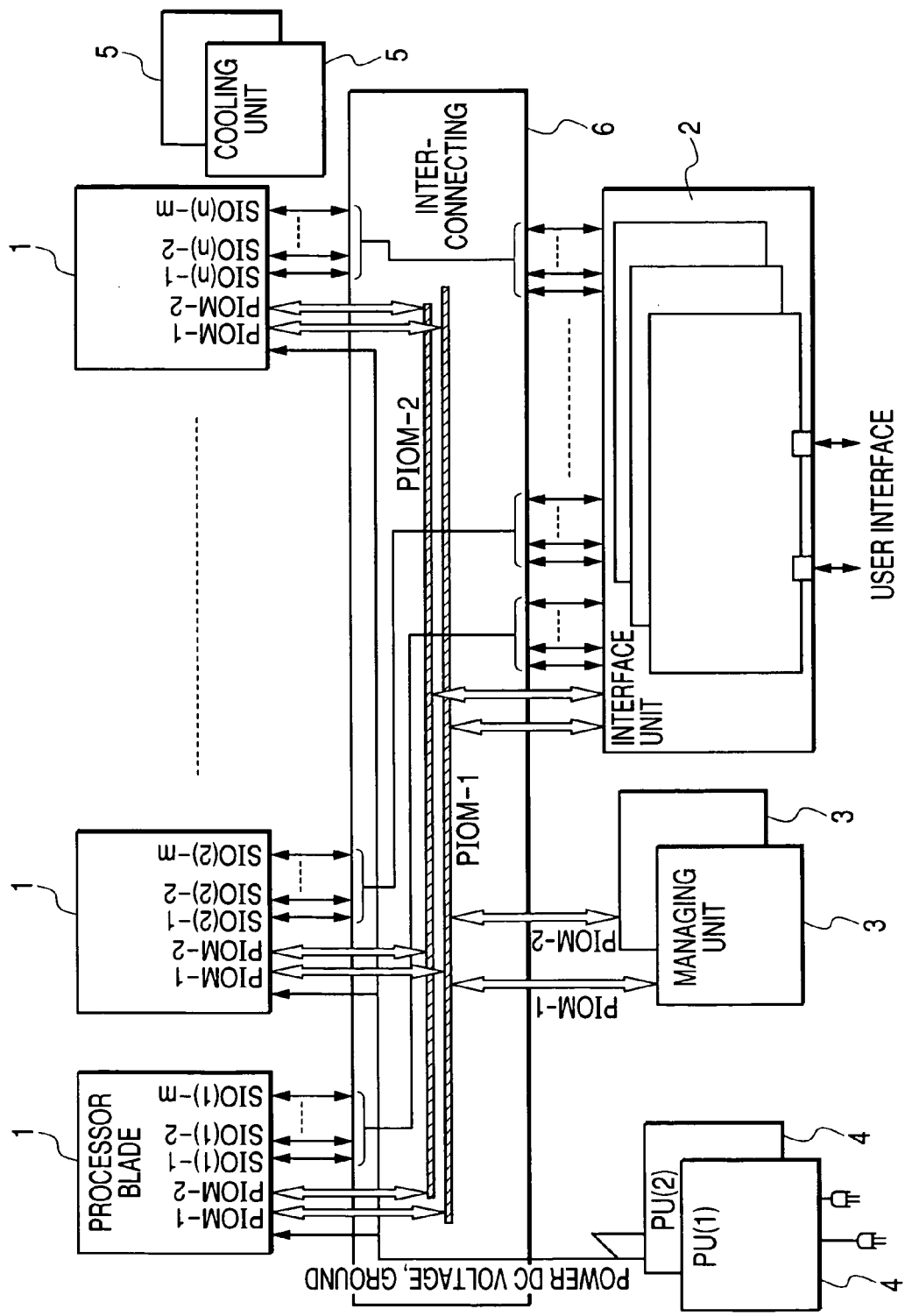
FIG. 1 is a block diagram of a blade server.

Reference not is made in detail to the examples illustrated in the accompanying drawings and discussed below. FIG. 1 is a block diagram for describing an example of the configuration of a server device, that is, a blade server.

As shown in FIG. 1, the blade server has multiple server devices, that is, multiple processor blades 1 that function as each server, and an interface unit 2, a managing unit 3, a power unit (PU) 4, a cooling unit 5, and an interconnecting unit 6 that are common components for these multiple processor blades. As described later, the blade server is accommodated in a common enclosure, for example, one enclosure or integrated multiple enclosures.

Each of the processor blades 1 performs various information processing according to user applications by a mounted processor. The interface unit 2 allows external equipment to electrically communicate a data signal with the processor blade 1. The interface unit 2 has a serial interface connected to the processor blade 1, and has an external personal computer, a workstation, and information equipment, such as a database processor, and a user interface that is connected to network equipment, such as a HUB and a switch. The managing unit 3 monitors, sets, and controls the status of each equipment inside the blade server. The power unit (PU) 4 converts the AC power into the DC power and supplies the power to each equipment inside the blade server. The cooling unit 5 has the cooling structure of a cooling fin, a heat pipe, a cooling fan, and a cooling system that cool each equipment inside the blade server. The interconnecting unit 6 has a signal line and a power line between each equipment inside the blade server. Further, the interconnecting unit has a connector to mount each unit, such as the processor blade 1.

The multiple processor units 1 and interface units 2 can be mounted in an enclosure, and are extended according to user applications. The multiple processor units 1 to be mounted need not have the same performance and functions, and can make a blade having different performance and functions coexist. This rule applies also to the interface unit 2 in the same manner. In FIG. 1, processor blades can be extended up to n blades. The multiple managing units 3, POWER UNITs 4, and cooling units can be mounted respectively (two units for this embodiment) can be mounted. If the one unit breaks down, redundant configuration in which the one unit is complemented by the remaining unit can be adopted.

The connection of each unit is as follows. That is, the interconnecting unit 6 has common bus lines PIOM-1 and -2, a mechanism that establishes the point-to-point connection of the processor blade 1 and the interface unit 2, and a power supply line from the power unit 4 to each unit. Accordingly, the processor blade 1 and the interface unit 2 are connected in the two systems of the common bus lines PIOM-1 and -2 and the point-to-point connection mechanism. Because the connection between the managing unit 3 and another unit, that is, the wiring between the managing unit 3 and the processor blade 1 or the interface unit 2, or the POWER UNIT 4 uses the common bus lines, the expansion of the accommodated number of interface units may be acceptable simply by extending the bus wiring. Further, as described later, the serial interface between the processor blade 1 and the interface unit 2 is connected by the point-to-point connection mechanism on the interconnecting unit 6. Even a processor blade that differs in performance and differs in the number of serial interfaces can match the connection mechanism with the number of interfaces every processor-blade 1. Consequently, the processor blade 1, that differs in the number of serial interfaces can be loaded together.

Figure 2:
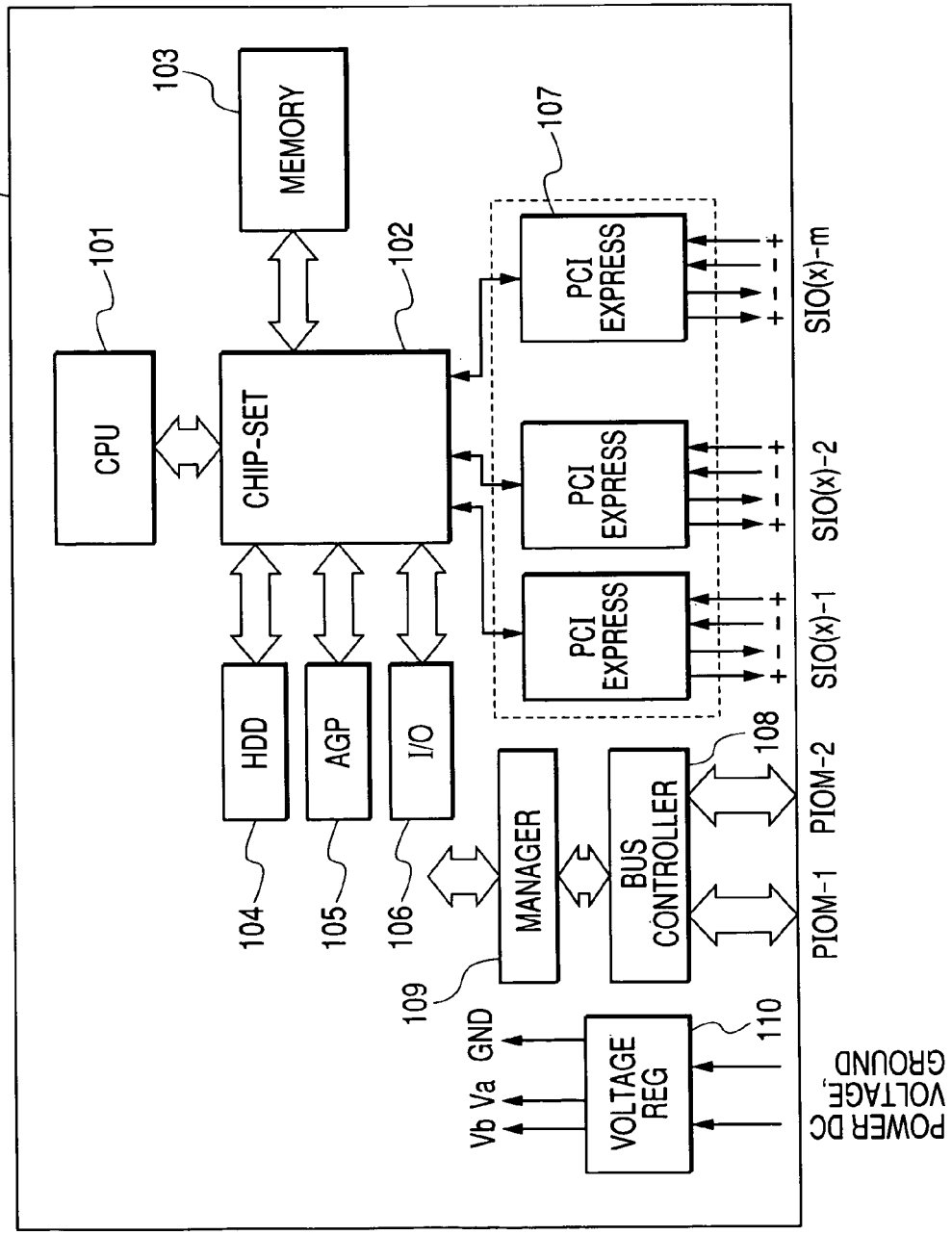
FIG. 2 is a block diagram of a processor blade.

FIG. 2 is a drawing showing an example of the configuration of the processor blade 1.

The processor blade 1 has a processor 101, a chip-set 102, a memory 103, various I/O devices 104 to 106, a PCI express controller 107, a bus controller 108, a manager 109, and a voltage regulator (REG) 110. The processor 101 executes various application programs. The chip-set 102 has a function necessary for a connecting device, such as a memory controller. The various I/O devices are the hard disk HDD 104, the AGP 105, and the other I/O 106. The expansion interface PCI express controller 107 and the bus controller 108 communicate with an external device.

The bus controller 108 is connected to the managing unit 3 through the bus line (PIOM), then extracts a control signal of a local processor blade and outputs the signal to the manager 109. The manager 109 is connected to the bus controller 108, then collects a monitoring signal of the local processor blade from each device in accordance with a command of the managing unit 3 and sends the signal from the bus line (PIOM) to the managing unit 3 via the bus controller 108. The manager 109 sends the control signal sent from the bus controller 108 to each device. In FIG. 2, two bus lines (PIOMs) are provided because there are two managing units 3. Usually, in the two bus lines (PIOM-1 and PIOM-2), the one is used, and the other is halted. When the managing unit 3 of the bus line used breaks down, the bus line that is being halted is used.

The voltage REG 110 converts the power DC voltage supplied from the POWER UNIT 4 into a necessary power voltage that is required by each device of the processor blade 1. The converted power voltage is supplied to each device.

The PCI express 107 is an interface controller for a general-purpose extended I/O device, and performs point-to-point serial transmission. The minimum configuration in which two signal lines per one-way transmission are needed, and four signal lines per two-way transmission are needed is used (SIO(x) x=1, 2, 3 . . . n). The four signal lines as the minimum configuration can be used independently respectively. A bandwidth (signal capacity per unit time) can be extended as required by bundling the multiple minimum configurations. The operation system of each processor blade recognizes the bandwidth when the system power turns on or the interface unit 2 is hot plugged in, and becomes operable. Still more, the processor blade 1 of FIG. 2 is composed of m pieces of signal lines (SIO(x)–1, . . . m).

Figure 3:
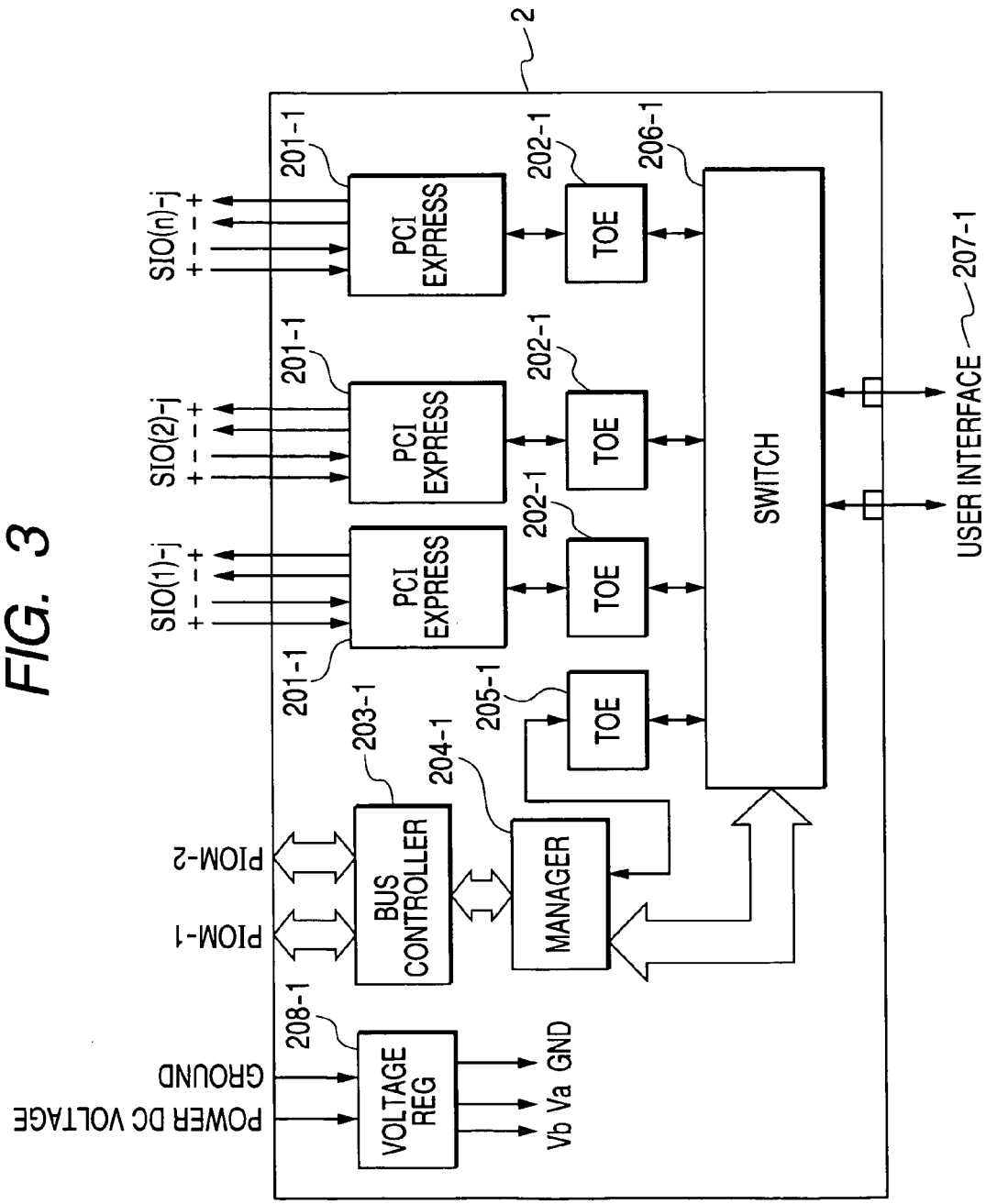
FIG. 3 is a block diagram of an interface unit.

FIG. 3 shows an example of the configuration of the interface unit 2 that is the network interface of the blade server of FIG. 1.

The interface unit 2 has a PCI express controller 201-1, a TCP/IP processor (TOE) 202-1, a switch 206-1, a bus controller 203-1, a manager 204-1, and a voltage REG 208-1. The bus controller 203-1, the manager 204-1, and the voltage REG 208-1 are the same configuration inside the processor blade 1. Each PCI express corresponds to a PCI express of each of the processor blades lone-to-one respectively. That is, each of the multiple PCI expresses 201-1 of the single interface unit 2 is connected via one of the PCI expresses 107 (SIO(x)-j j=1, 2, 3 ... m) on each processor blade(x)1 (x=1, 2, 3 ... n) and the connection mechanism on the interconnecting unit 6.

The signal sent and received by a PCI express is input and output to the TCP/IP processor (TOE) 202-1. The TCP/IP (TOE)202-1 performs the TCP/IP protocol processing concerning the data input from the PCI express 201-1. After the TOE converts the data into IP packet data and further into Ether packet data, it sends the data to the switch 206-1. Further, after the TOE 202-1 terminates the Ether packet data sent from the switch 206-1 and performs the TCP/IP protocol processing, it outputs the data to the PCI express 201-1.

The bus controller 203-1 is connected to the managing unit 3 via the bus line (PIOM) and extracts a control signal into a local interface unit and a signal sent to an external managing server, then outputs the signals to the manager 204-1. The manager 204-1 is connected to the bus controller 203-1 and sends a monitoring signal collected from each device of the local interface unit in accordance with a command of the managing unit 3. Further, the manager 204-1 sends a control signal that is sent from the external managing server and input from a user interface 207-1 via the switch 206-1 to the managing unit 3 from the bus line (PIOM) via the bus controller 203-1.

The manager 204-1 outputs the control signal sent from the bus controller 203-1 to each device. The control signal received from the bus controller 203-1 to be sent to the user interface 207-1 is sent to the TCP/IP processor 205-1. In the same manner as the processor blade 1, the two bus lines PIOM-1 and PIOM-2 connected to the interface unit 2 are available. The one bus line is used and the other bus line is halted. When the managing unit 3 of the bus line used breaks down, the bus line that is halted is used. After the TOE 205-1 terminates the Ether packet data sent from the switch 206-1 and performs the protocol processing of the TCP/IP, it outputs the data to the manager 204-1.

The switch 206-1 performs the protocol processing of each layer (layers 2 to 7) concerning the Ether packet input and output from the user interface 207-1 connected externally and the Ether packet input and output from the TCP/IP processors 202-1 and 205-1. After the processing, the switch switches the packet whose protocol processing was performed between each port of the TCP/IP processors 202-1 and 205-1 and the user interface 207-1. The voltage REG 208-1 has the same configuration as a processor blade.

Figure 4:
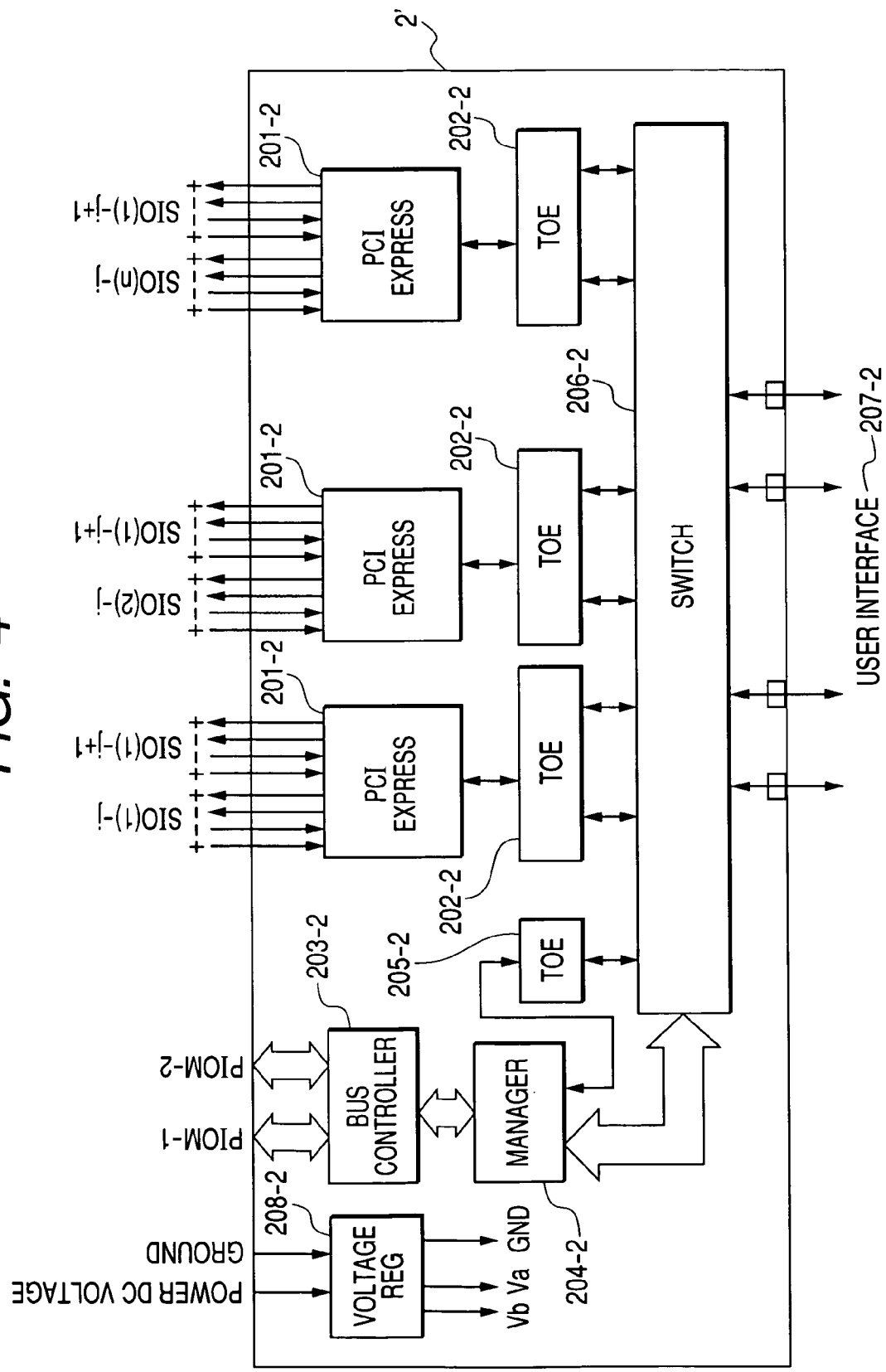
FIG. 4 is a drawing showing another embodiment of the present invention of an interface unit.

FIG. 4 shows another example of the interface unit of the blade server of FIG. 1.

An interface unit 2' of FIG. 4 differs from FIG. 3 in that the PCI express 201-2 is connected by bundling the two PCI expresses having the minimum configuration. That is, among the m PCI expresses input and output from the processor blade 1, the two PCI expresses SIO(x)-j and SIO(x)-j+1 (j=1, 2, 3 ..., m-1 x=1, 2 ... n) are bundled and connected in a double bandwidth. Another function is the same as the interface unit 2 of FIG. 3.

Figure 5:
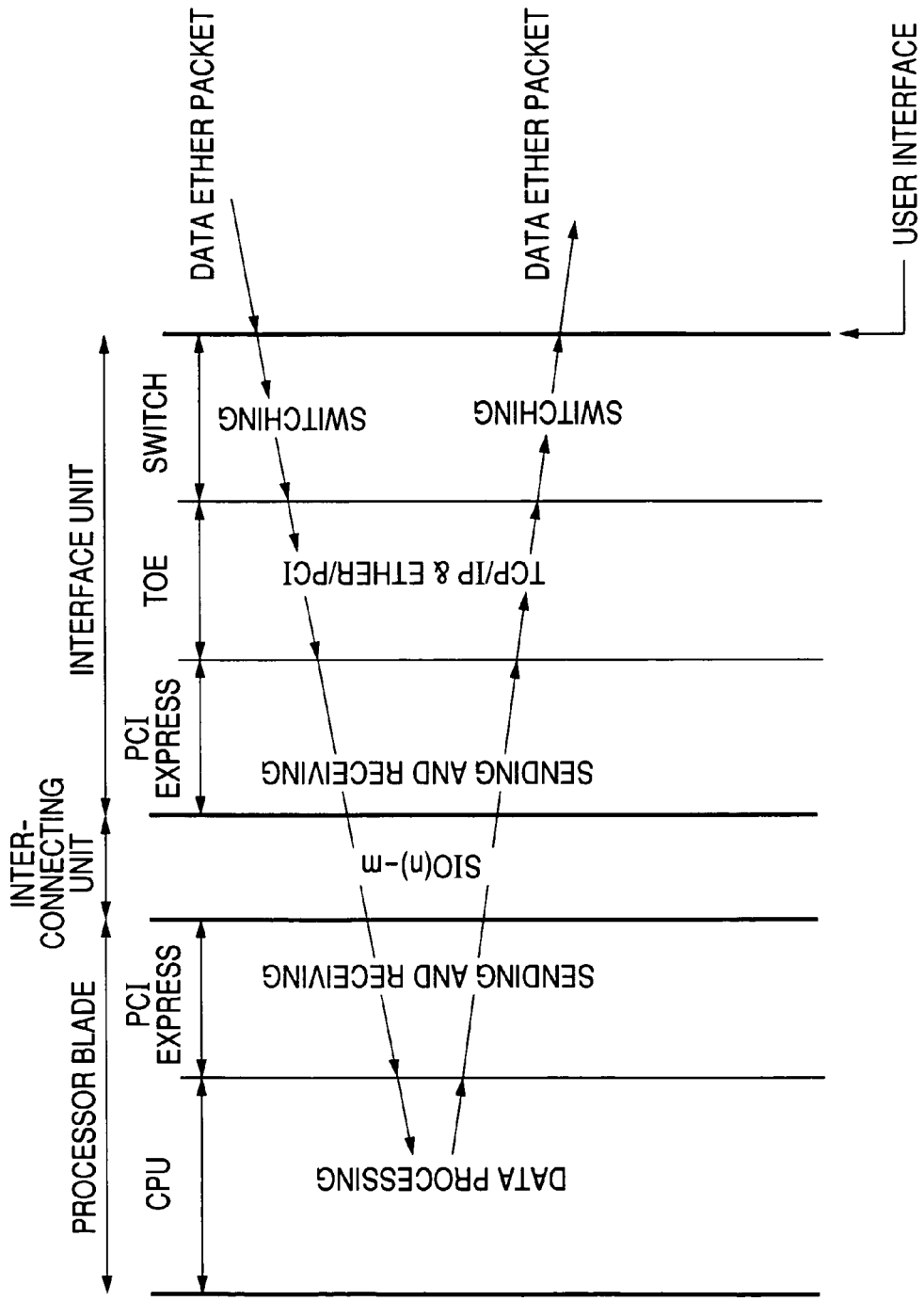
FIG. 5 is a sequence drawing for describing a flow of the signals of the processor blade and the interface unit.

FIG. 5 is a sequence diagram of the signal between the processor blade 1 and the interface unit 2.

In FIG. 5, the switch 206-2 of the interface unit 2 receives Ether packet data and switches it to the TOE that becomes a destination. After the TOE (TCP/IP processor) terminates the Ether packet data sent from the switch 206-2 and performs the protocol processing of the TCP/IP, it sends the data to a PCI express. The PCI express sends the data to the processor blade 1 via an interconnecting unit as a serial signal. In the processor blade 1, the PCI express receives the serial signal and processes the data that the processor received.

Otherwise, a PCI express outputs the data in which the processor of the processor blade 1 executes various application programs and performs data processing, as a serial signal. The PCI express of the interface unit 2 receives the serial signal via an interconnecting unit. After the TOE performs the protocol processing of the TCP/IP concerning received data and converts the data into IP packet data, the TOE converts the data into Ether packet data. The switch 206-2 sends the Ether packet data to an external device.

In the server system of FIG. 1, the interface unit 2 has a processor TOE that performs the TCP/IP processing. Accordingly, as shown in FIG. 5, because a processor blade need not perform a large quantity of TCP/IP processing, the processor load of the blade processor is reduced in comparison with the conventional configuration in which the processor of the processor blade performed the TCP/IP processing.

Figure 6:
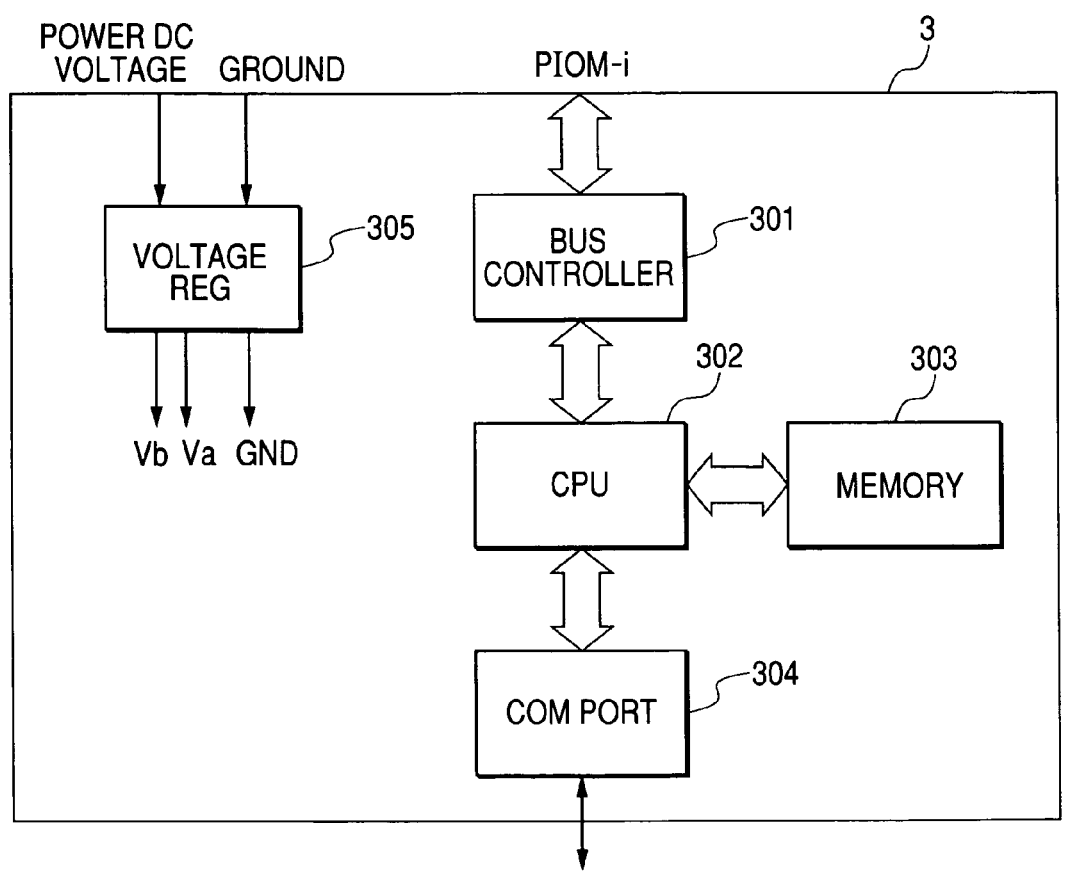
FIG. 6 is a block diagram of a managing unit in the blade server of FIG. 1.

FIG. 6 shows an example of the configuration of the managing unit 3 in the blade server of FIG. 1.

The managing unit 3 has a bus controller 301, a processor 302, a memory 303, a communication (com) port 304, and a voltage REG 305.

The bus controller 301 is connected to each processor blade 1 or each interface unit 2 that is each unit inside a blade server through a bus line (PIOM-i i=1 or 2), and sends a monitoring signal of each unit to the processor 302. The monitoring signal of each unit includes, for example, a mounting state, an operating state, or fault information of the processor blade 1 or the interface unit 2. Further, the control signal sent from an external managing server via the user interface 207 and sent via the bus line (PIOM-i i=1 or 2) is sent to the processor 302. The control signal includes various operation settings of the processor blade 1 or the interface unit 2.

The processor 302 processes the aforementioned monitoring signal and control signal and sends the signal that controls each processor blade 1 and each interface unit 2 to the bus line (PIOM-i: i=1 or 2) via the bus controller 301. The memory 303 stores firmware for the processing performed by the processor 302 and is used as a processing memory for operation. The com port 304 is a terminal for communicating data with an external managing server. The control monitoring data input and output between the blade server and the external managing server can be connected directly from the con port 304 to the processor 302 as well. The voltage REG 305 is the same as another unit.

Figure 7:
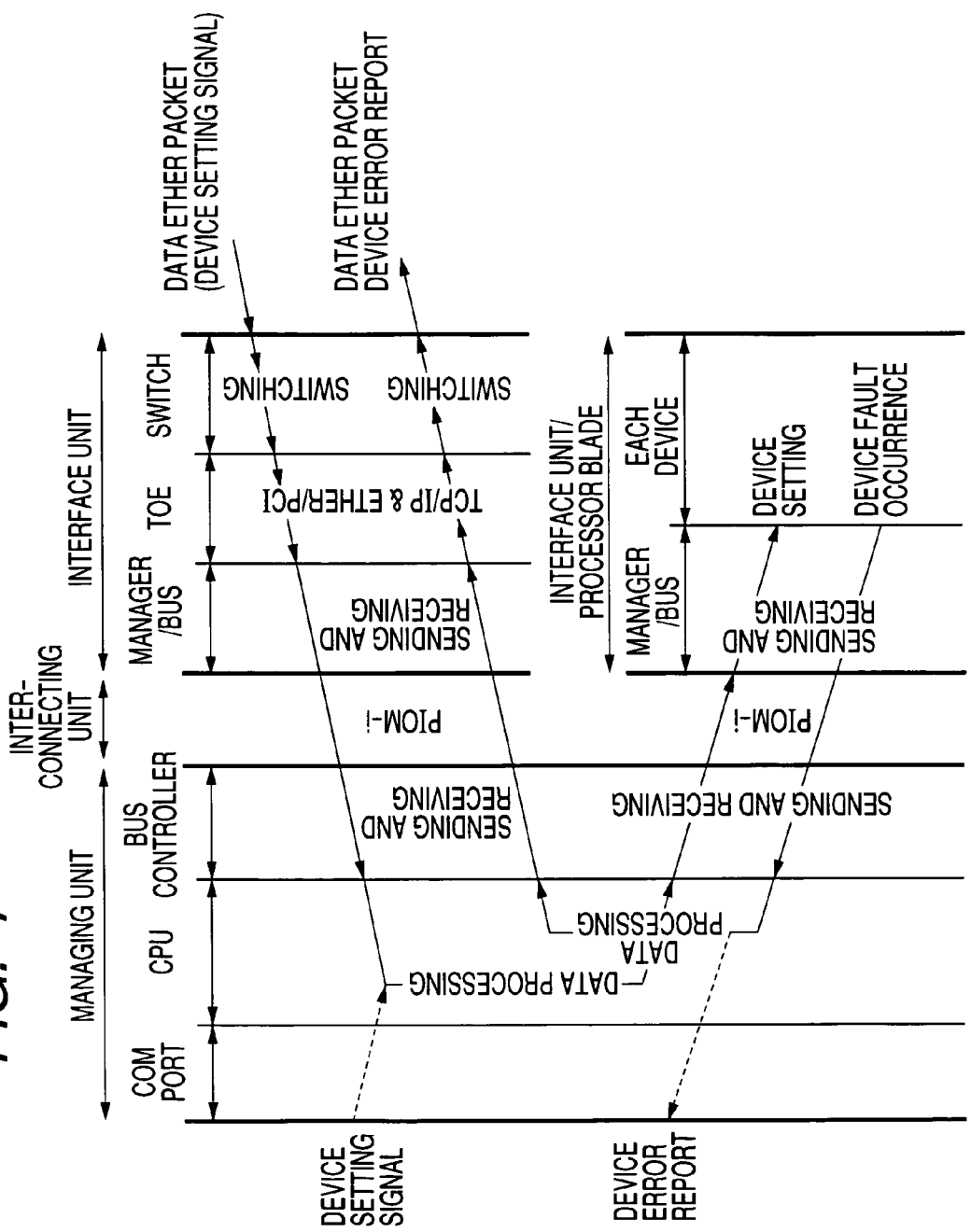
FIG. 7 is a sequence drawing for describing the flow of the signals of the managing unit, the processor blade, and the interface unit.

FIG. 7 is a drawing showing the processing of the managing unit 3. FIG. 7, as an example, shows a sequence of the signal between the managing unit 3 and the blade processor 1 or the interface unit 2.

The managing unit 3 processes the control signal concerning various operation settings including the addition and change of the processor blade 1 or the interface unit 2 sent from an external managing server. A device setting signal is sent from the external managing server to the interface unit 2 and processed according to protocol. Subsequently, the signal is sent to the managing unit 3 via an interconnecting unit or the com port 304 and processed as data in the processor 302. Then each device is set according to the control signal.

Further, the managing unit 3 monitors a mounting state, an operating state, and the presence of a fault of the processor blade 1 or the interface unit 2. If a device fault occurs in each device of a processor blade, a notification of the "Device Fault" is sent to the managing unit 3 via the interface unit 2 and processed as data. Subsequently, the notification of the "Device Fault" is sent to the interface unit 2 and processed according to protocol, then sent to an external managing server via the user interface 207 or the com port 304.

Figure 8:
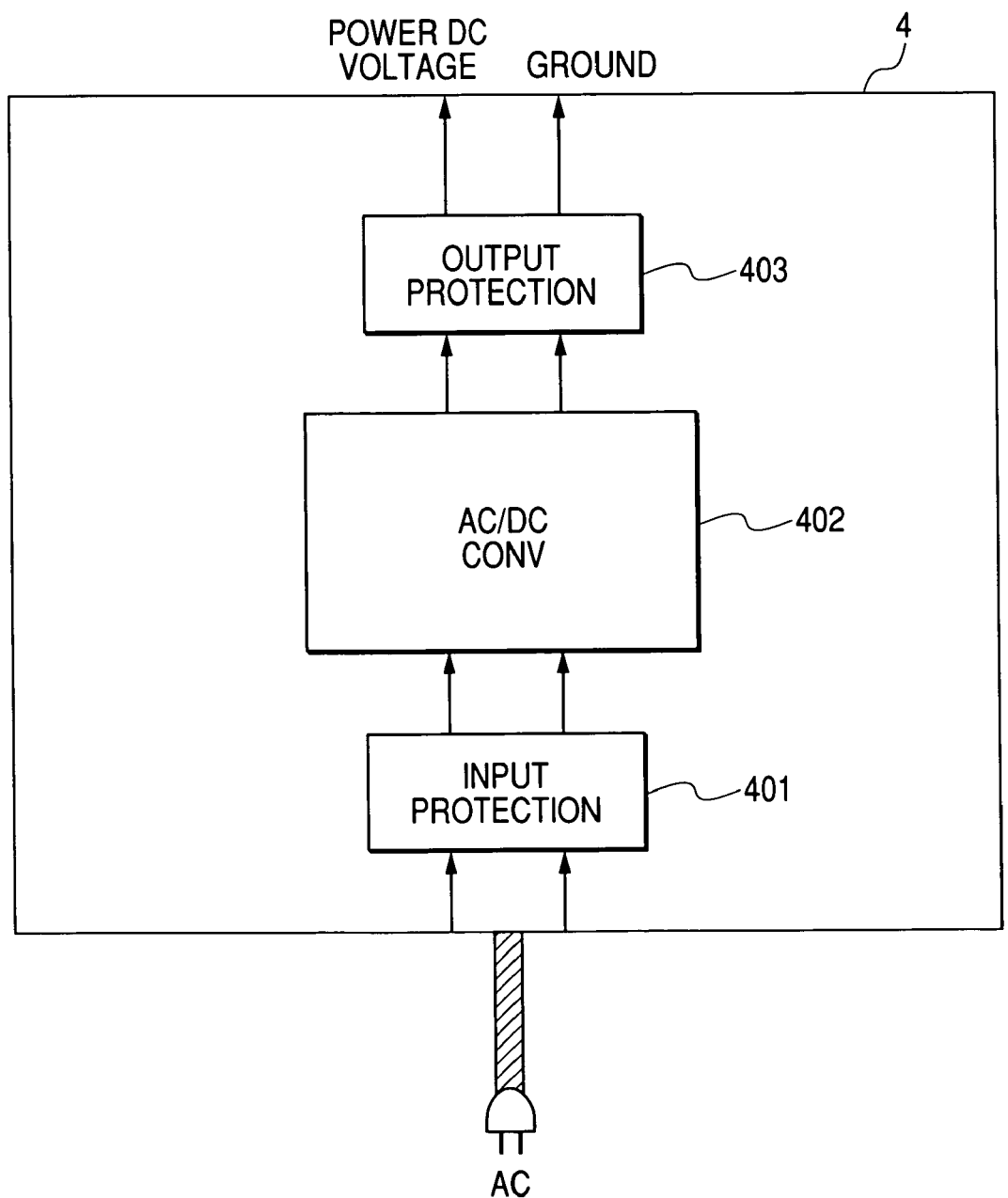
FIG. 8 is a block diagram of a power unit (PU).

FIG. 8 shows an example of the configuration of the power unit 4 of the blade server of FIG. 1. The power unit 4 has an input protection circuit 401, an output protection circuit 403, and an AC/DC CONV 402. The input protection circuit 401 or the output protection circuit 403 protects the power unit 4 against an overvoltage or overcurrent when it is input or output. The AC/DC CONV 402 converts an input AC current into a predetermined DC current.

An AC voltage is input from an AC power unit to the AC/DC CONV 402 via the input protection function 401 against an overvoltage or overcurrent. The AC/DC CONV 402 converts the AC power into DC power and supplies the power to each unit inside the blade server 1 via the output protection function 403 against the overcurrent. Output enables a parallel operation so that redundant configuration can be obtained in the multiple power units 4. In the server system of FIG. 1, an example in which two power units are provided is shown.

Figure 9:
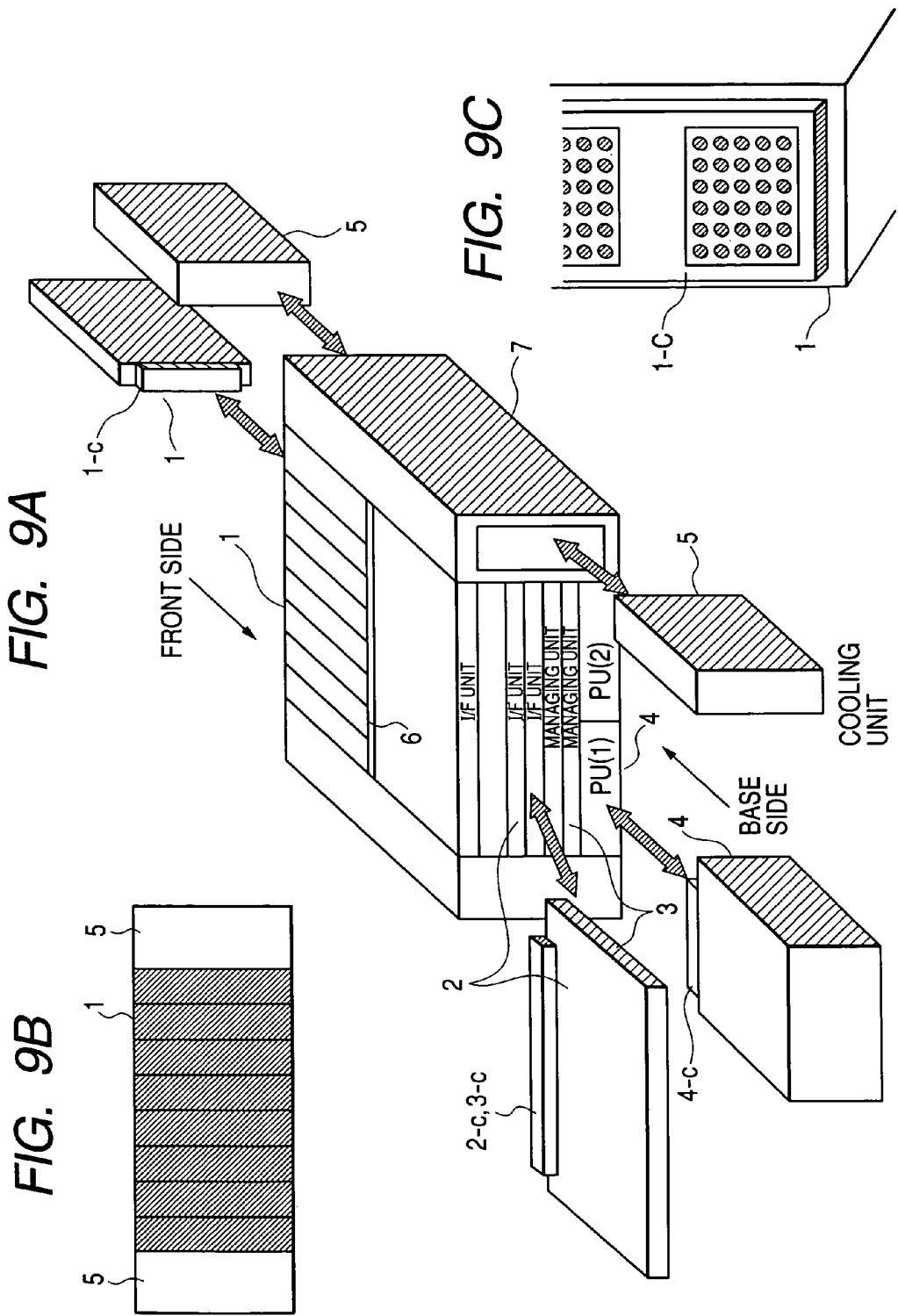
FIG. 9A is an exploded perspective view of the blade server of FIG. 1.
FIG. 9B is a front view of the blade server of FIG. 1.
FIG. 9C is an enlarged view of the connector part of the processor blade 1.

FIG. 9A is an exploded perspective view of the blade server of FIG. 1, FIG. 9B is a front view of the blade server of FIG. 1, and FIG. 9C is an enlarged view of the connector part of the processor blade 1. A blade server is installed in a rack or a desktop. Each unit of the processor blade 1, the interface unit 2, the managing unit 3, the power unit 4, the cooling unit 5, and the interconnecting unit 6 is accommodated in the enclosure 7 as shown in FIG. 9.

Except the interconnecting unit 6, each unit can be inserted into and removed from the front side or back side of the enclosure in accordance with a fault, the unit expansion according to a user's need, or functional expansion even when it is operating. For example, the processor blade 1 is arranged on the front side of the enclosure and can be inserted into and removed from the direction of an arrow even when it is operating, then is connected to the interconnecting unit 6 by using a connector 1-c. The multiple processor blades 1 can be accommodated within the permissible range of the enclosure 7 in accordance with the user's need.

As shown in the front view of FIG. 9B, the server system of FIG. 9 accommodates the eight processor blades 1. The signals, SIO(x)–j(x=1, 2 . . . 8, j=1, 2 . . . m), PIOM-1, PIOM-2, and a power DC voltage, input and output to the processor blade 1 are input and output from the contact of this connector 1-c respectively. In FIG. 9, the connector 1-c is installed on the back side of the enclosure of the processor blade 1. The signal line of the connector 1-c is divided into multiple groups. One group includes at least the wiring of a set of PCI expresses, that is, the wiring of four PCI expresses signal that are the minimum unit.

The interface unit 2, the managing unit 3, and the power unit 4 are arranged on the back side of an enclosure and can be inserted into and removed from the direction of an arrow even when they are operating, then are connected to the interconnecting unit 6 by using connector 2-c, 3-c, or 4-c. In the same manner as the processor blade 1, the signal input and output to each unit is input and output from the contact of this connector 2-c, 3-c, or 4-c. Further, the multiple interface units 2, managing units 3, and power units 4 can be accommodated in the same manner as the processor blade 1 in accordance with user's needs, and be extended and abolished later.

The cooling unit 5 is arranged on the enclosure side and can be inserted into and removed from the direction of an arrow on the front or back side even when it is operating. Further, if the power is necessary, it is supplied from the connector connected to the interconnecting unit 6 in the same manner as another unit.

Figure 10:
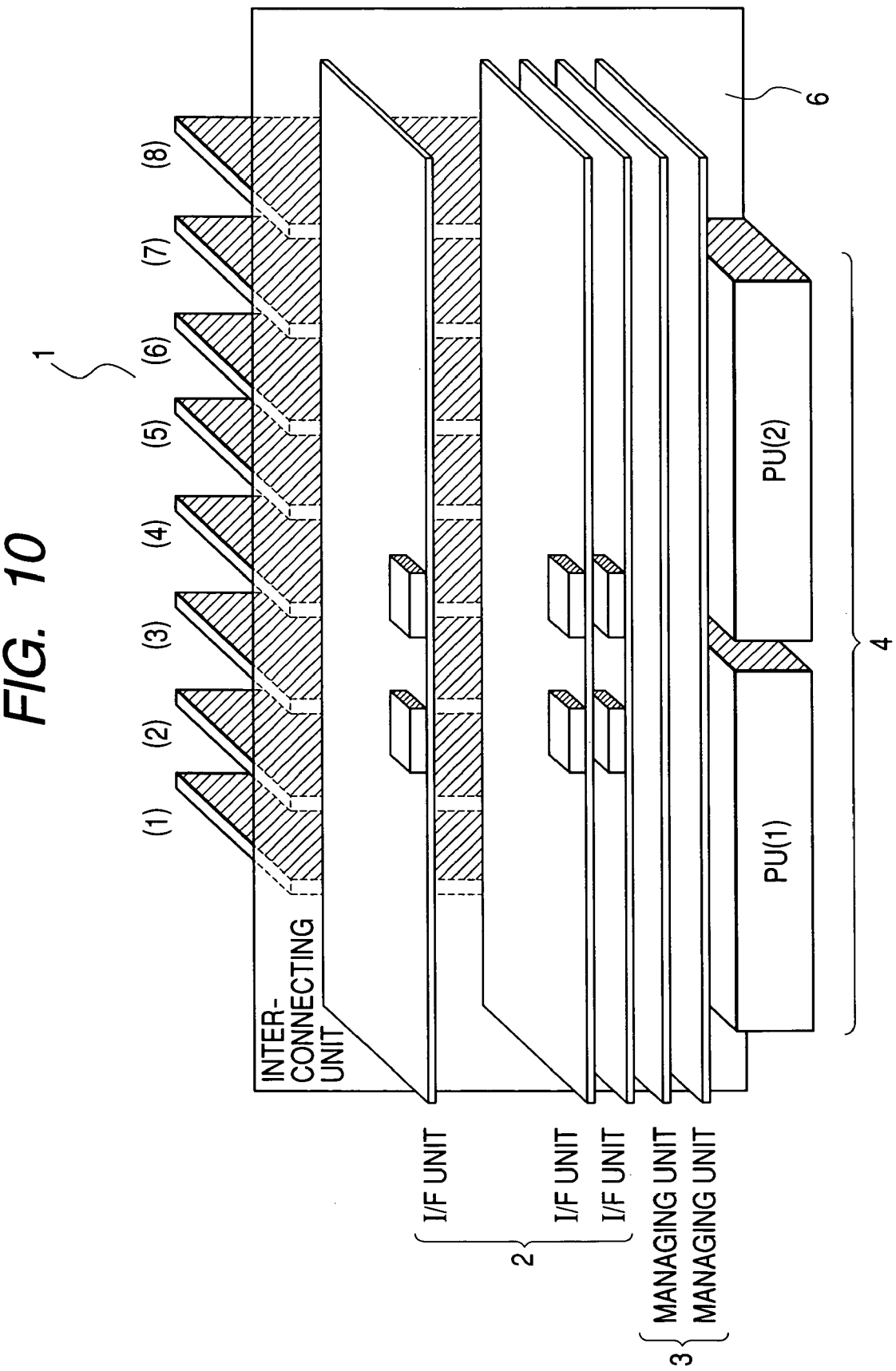
FIG. 10 shows a location relation of each unit.

FIG. 10 is the top views of the enclosure inside of FIGS. 9A to 9C, and shows a location relation between the processor blade 1, the interface unit 2, the managing unit 3, or the power unit 4 and the interconnecting unit 6.

As shown in FIG. 10, the processor blade 1 is mounted lengthwise and the interface unit 2, the managing unit 3, or the power unit 4 is mounted crosswise. That is, the interface unit 2, the managing unit 3, or the power unit 4 mounted on the back side is mounted so that each unit almost intersects with the processor blade 1 mounted on the front side sandwiching the interconnecting unit 6. The interface unit 2, the managing unit 3, or the power unit 4 is mounted in parallel and intersect with the arrangement of the processor blade 1. The relation between the arrangement of the processor blade 1 and the arrangement of the interface unit 2 is most important here. These arrangements intersect with each other, and, as described later, these units can be connected directly. Further, even when a signal line for a serial interface increases, a measure for the increase can be taken by replacing each connector, and the inside of the interconnecting unit 6 need not be reconstructed.

Figure 11:
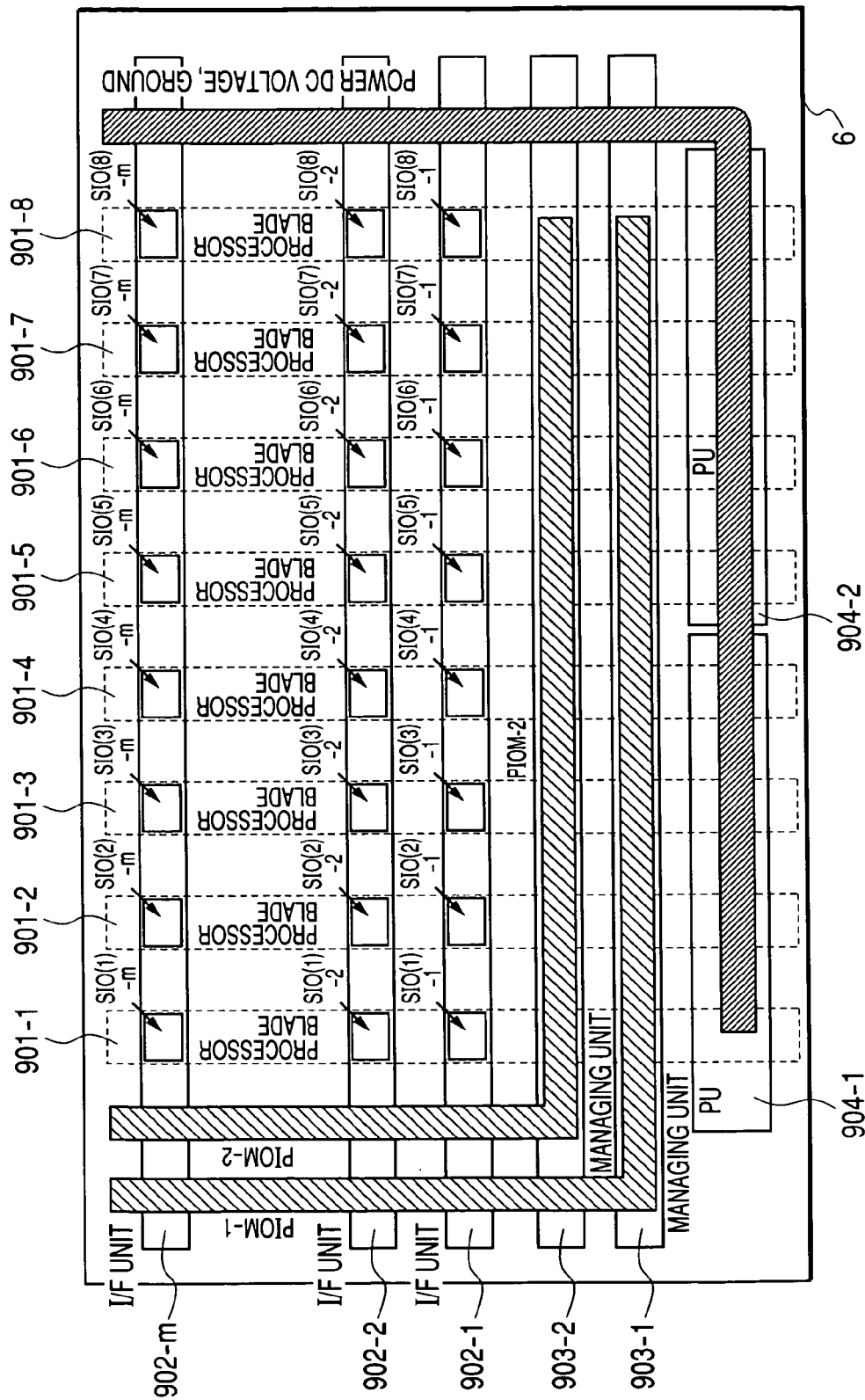
FIG. 11 shows a connection point location between the signal line inside an interconnecting unit and each unit.

FIG. 11 shows a connection point location between the signal line inside the interconnecting unit 6 and each unit in FIG. 1. That is, FIG. 11 shows the wiring of the signal line of the interconnecting unit 6 and the connecting connector location relation of each unit of the processor blade 1, the interface unit 2, the managing unit 3, or the power unit 4 in FIG. 10 in two dimensions.

901-1 to 901-8 are connection locations on the interconnecting unit 6 of the connector 1-c of the processor blade 1. The connector 1-c is mounted on the back side of the interconnecting unit 6 of FIG. 11. 902-1, 902-2, and 902-m are connection locations on the interconnecting unit 6 of the connector 2-c of the m interface units 2. Besides, the connection locations on the interconnecting unit 6 of the connector 2-c of the interface unit 2 are arranged even between the 901-2 and 902-m at equal intervals. 903-1 and 903-2 are the connection locations on the interconnecting unit 6 of the connector 3-c of the two managing units 3, and 904-1 and 904-2 are the connection locations on the interconnecting unit 6 of the connector 4-c of the two power units 4.

Wiring is performed so that the signal line SI0(x)–j (x=1, 2, 3 . . . 8 j=1, 2, 3 . . . ) between the processor blade 1 and the interface unit 2 can be connected directly on an intersection. The intersection is located between the connection locations on the interconnecting unit 6 of the connector 1-c of the processor blade 1 and the connection locations on the connection locations on the interconnecting unit 6 of the connector 2-c of the interface unit 2. The details are described with reference to FIG. 12.

The bus wiring PIOM-1 or -2 between the managing unit 3 and the processor blade 1 is applied on the intersection between the connection locations on the interconnecting unit 6 of the connector 1c of the processor blade 1 and the connection locations on the interconnecting unit 6 of the connector 3-c of the managing unit 3. The bus wiring PIOM-1 or -2 between the managing unit 3 and the interface unit 2 makes an interface unit traverse by drawing an interconnecting pattern from the connector 3-c of the managing unit 3 on a PC board as shown in FIG. 11. The interconnecting pattern of the managing unit 3 is connected to the interface unit 2 on the intersection with the connection locations on the interconnecting unit 6 of the connector 2-c of the interface unit 2. Accordingly, the bus wiring that connects the processor blade 1, the interface unit 2, and the managing unit 3 becomes a V-shaped form.

Further, the power DC voltage and ground supplied from the power unit 4 to the processor blade 1 are wired on the intersection of the connection locations on the interconnecting unit 6 of the connector 1-*c* of the processor blade 1 and the connection locations of the interconnecting unit 6 of the connector 4-*c* of the power unit 4. The power DC voltage and ground supplied from the power unit 4 to the interface unit 2 are connected to the interface unit 2 on the intersection with the connection locations on the interconnecting unit 6 of the connector 2-*c* of the interface unit 2. In this case, a wiring pattern is drawn from the connector 4-*c* of the power unit 4 on a PC board as shown in FIG. 11.

The wiring between a common component power unit, a managing unit, or a processor blade and an interface unit is performed on a PC board as common bus wiring.

Figure 12A:
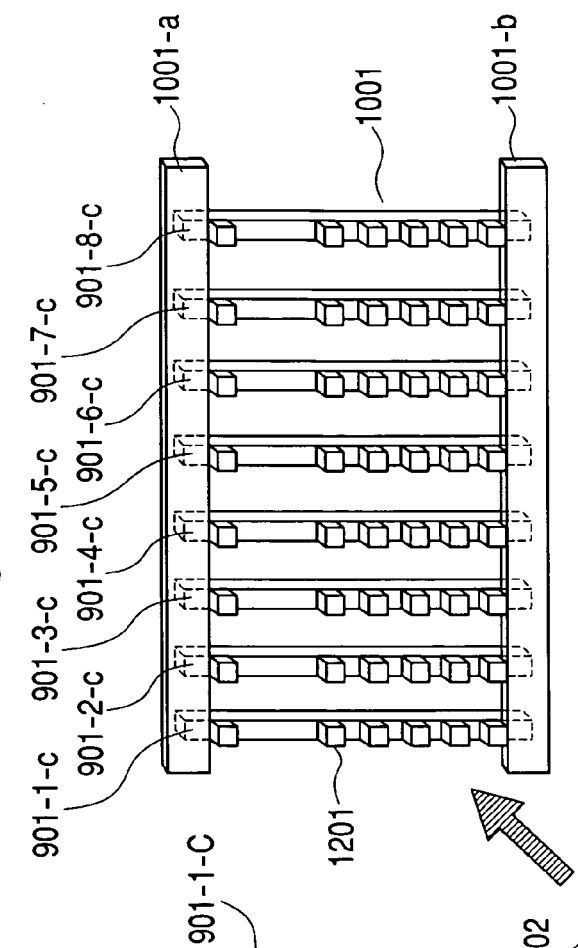
Figure 12C:
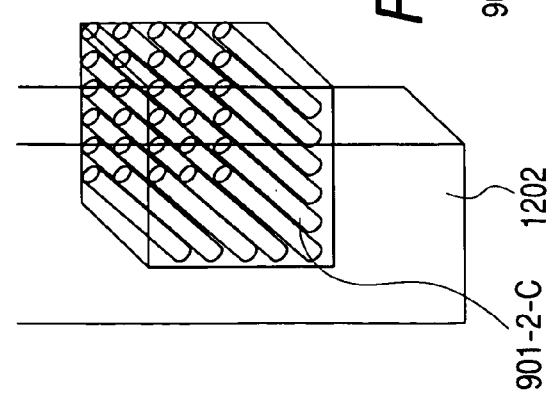
Figure 12B:
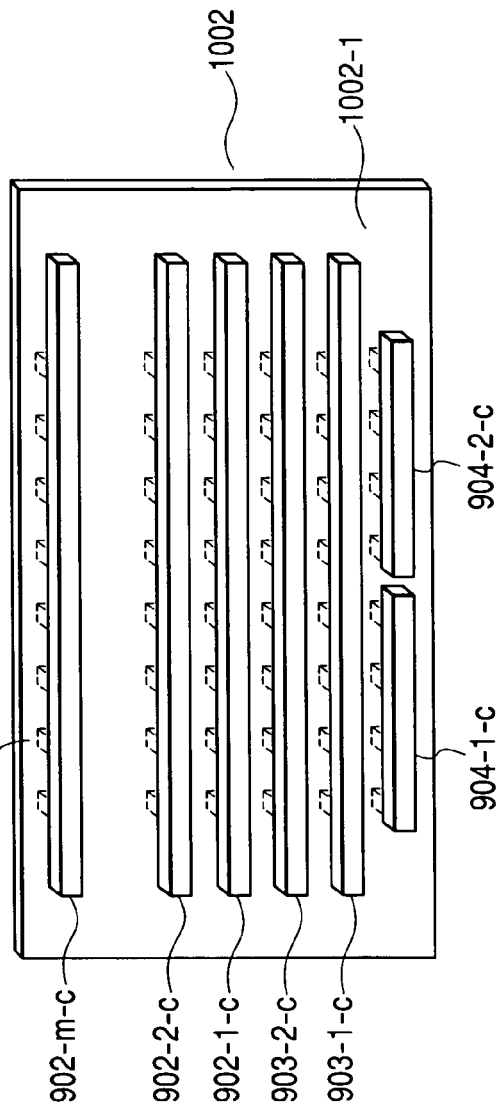

FIGS. 12A to 12C are exploded views of the interconnecting unit 6. FIG. 12A shows a front side unit 1001 of the interconnecting unit 6. FIG. 12B shows a back side unit 1002 of the interconnecting unit 6. FIG. 12C is an enlarged view of the connector part of the front and back side units.

The interconnecting unit 6 is divided into the front side unit 1001 and the back side unit 1002. The front side unit 1001 has a connector that is connected to the connector 1-*c* of the processor blade 1. The back side unit 1002 has a connector that is connected to the connector 2-*c*, 3-*c*, or 4-*c* of the interface unit 2, the managing unit 3, or the power unit 4. Both the units are wired and connected back to back in the intersection described in FIG. 11 between the interface unit 2, the managing unit 3, or power unit 4 connected on the back side and the processor blade 1 connected on the front side. The interconnecting unit 6 can be also referred to as a connector unit that connects each unit together with the connector of each unit.

The front side unit 1001 has a connector and frames 1001-*a* and -*b* that support the connector. A frame supports a connector from front and behind. The frame, however, can also be of a square-shaped form including the left and right struts to increase its strength. Some connectors of the front side unit 1001 are connector housings 901-1-*c* to 901-8-*c* that connect the connector 1-*c* of the processor blade 1. Further, the front side unit 1001 has a connector 1201 for being connected to the back side unit 1002. The connector 1201 has a contact that is connected to the back side unit 1002 and wired into the connector 1-*c* of the processor blade 1 at the position of the intersection described in FIG. 11. The multiple connectors 1201 are mounted on the back side of the respective connector housings 901-1-*c* to 901-8-*c*. These connectors are arranged as shown in FIG. 12A and fixed inside a blade server enclosure.

In the back side unit 1002 are arranged connector housings 902-1-*c* and 902-2-*c* to 902-*m*-*c* that connect the connector 2-*c* of the interface unit 2, connector housings 903-1-*c* and 903-2-*c* that connect the connector 3-*c* of the managing unit 3, connector 904-1-*c* and 904-2-*c* that connect the connector 4-*c* of the power unit 4, as shown in the drawing. The back side unit is fixed to the PC board 1002-1 of the plate shape on the back side. The PC board 1002-1 is fixed inside a blade server enclosure.

Multiple connectors 1202 having contacts connected to the front side unit 1001 at the position of the intersection described in FIG. 11 and wired into the connector 2-*c*, 3-*c*, or 4-*c* of the interface unit 2, the managing unit 3, or the power unit 4 are installed on the front side of the PC board 1002-1. The bus wiring PIOM-1 or -2 and power DC voltage and ground described in FIG. 11 are printed wired on the PC board 1002-1 and connected to the connectors housings 902-1-*c*, 902-2-*c* to 902-*m*-*c*, 903-1-*c*, 904-1-*c*, and 904-2-*c*.

Front and back side units are connected by fitting the connector 1201 and the connector 1202. In FIG. 12C, the connector 1201 of the front side unit is a female connector, and the connector 1202 of the back side unit is a male connector. Otherwise, both the connectors can be even reversed and other connectors can be used.

Accordingly, the processor blade 1 and the interface unit 2 mounted in the interconnecting unit 6 are connected to the connector 1-*c* of the processor blade 1, the four types of the connectors 901-1-*c* to 901-8-*c*, the connector 1201, the connector 1202, the connectors 902-1-*c* to 902-8-*c* of the interconnecting unit 6, and the connector 2-*c* of the interface unit 2.

Further, the connector 1201 of the front side unit 1001 is connected on the connectors 901-1-*c* to 908-8-*c* detachably. Further, the connectors 901-1-*c* to 908-8-*c* are connected to the frames 1001-*a* and 1001-*b* detachably. The same rule also applies to the connector 1202 of the back side unit 1002 and the connectors 902-1-*c* to 902-*m*-*c*.

The connector 1201 of the front side unit 1001 and the connector 1202 of the front side unit 1002 are connected in this manner. As a result, the signal line of the PCI express of the processor blade 1001 and the PCI express of the interface unit 2 are connected directly. That is, the wiring of the PCI express in each of the processor blade 1 and the interface unit 2 is directly connected back to back through a connector. When a signal line is increased in an interface unit, a measure for the increase can be taken by replacing the connector with the number of connectors that corresponds to a new signal line. That is, for an interface unit, when the number of signal lines of the PCI express is increased by the performance expansion of the processor blade, a measure for the increase can be taken only by changing the connector. The interconnecting unit 6 need not be designed anew.

Further, because the wiring between a common component and a blade is performed using the connector 1201 of the front side unit 1001 and the connector 1202 of the front side unit 1002 arranged in a grid shape, the space penetrating between the front and back sides of an enclosure can be provided and effective cooling can be performed.

FIGS. 13A and 13B show a cross-sectional configuration viewed from side face in which the front side unit 1001 and the back side unit 1002 of the interconnecting unit 6 are connected. FIG. 13A shows the case where the example of FIG. 3 is used as an interface unit, and FIG. 13B shows the case where the examples of FIGS. 3 and 4 are used as the interface unit. As shown in the drawing, the wiring between the processor blade 1 connected to the front side and the interface unit 2, the managing unit 3, or the power unit 4 arranged at the back side applies to the connection line between the connectors only.

Figure 14:
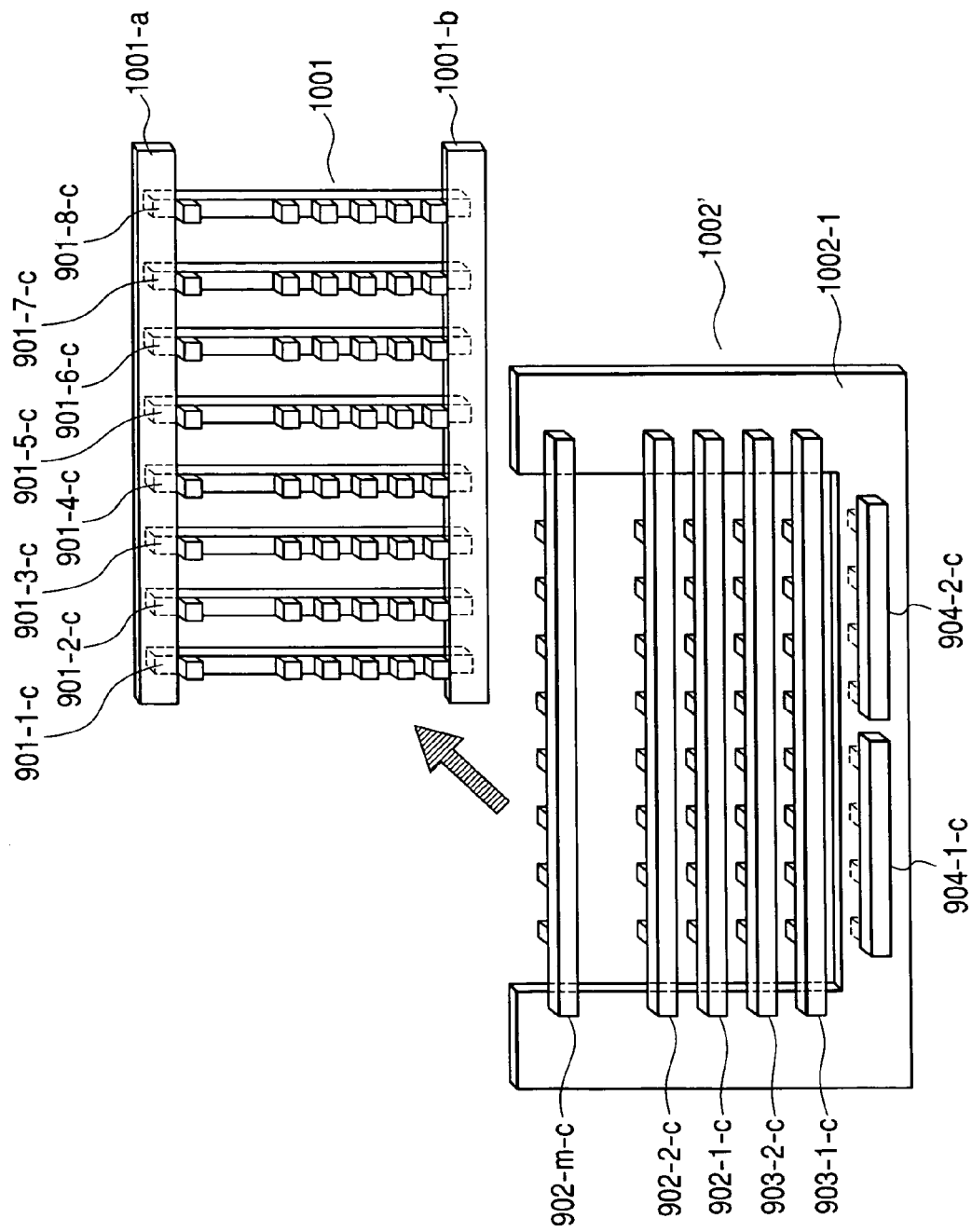
FIG. 14 is another example of the structure of the interconnecting unit based on signal wiring.

FIG. 14 is a modification example of the interconnecting unit 6 shown in FIG. 12. In FIG. 14, the PC board 1002-1' of the back side unit 1002 is constructed in a U-shaped form whose central part was hollowed, with only on the lower side and both sides of a wiring area. In this case, a bus is wired inside the connectors 903-1-*c* and 903-2-*c* that connect the managing unit 3 and the processor blade 1. Further, the wiring between the managing unit 3 and the interface unit 2 applies to a PC board that is not shown and is connected to the bus wiring inside the connectors 903-1-*c* and 903-2-*c*. The same rule applies also to the power unit 4. The PC board 1002-1' is constructed into a U-shaped form in this manner, and the air on the front and back sides blows through more easily, thereby improving a cooling effect.

Furthermore, FIG. 15 shows another example of the interconnecting unit 6. In the existing configuration, only the processor blade 1 is mounted on the front side of a server system, and the interface unit 2, the managing unit 3, or the power unit 4 that function as another common component is mounted on the other back side. There is some possibility that the processor blade 1 is mounted on the same side of the common component. In FIG. 15, the processor blade 1 and the managing unit 3 are mounted on the same front side.

As described above, to increase the signal line of the PCI express in the processor blade 1 easily and enable functional expansion, desirably, the processor blade 1 and the interface unit 2 should be connected directly using the connectors 1201 and 1202 of the interconnecting unit 6. Based on this point, it is desirable that the processor blade 1 and the interface unit 2 should not be mounted on a single side, but should be mounted on a separate side. Further, to sufficiently secure the permissible number of processor blades 1 to be mounted, it is desirable the processor blade 1 is mounted on the whole surface of one side. If the installation space of an interconnecting unit is wide, however, some of common components can be mounted on the same side of the processor blade 1.

As shown in FIG. 15, when the managing unit 3 is mounted on the same side of the processor blade 1 in parallel, the managing unit 3 and the interconnecting unit 6 are connected in the same manner as the processor blade 1. In that case, the connection of the managing unit 3 and the interconnecting unit 6 and the connection method of the managing unit 3 and the interface unit 2 are reversed with respect to the example of FIG. 11. That is, in FIG. 15, the managing unit 3 and the processor blade 1 are connected using the wiring applied to the PC board 1002-1. Conversely, the managing unit 3 and the interface unit 2 are connected through the connector of the interconnecting unit 6.

Figure 16A:
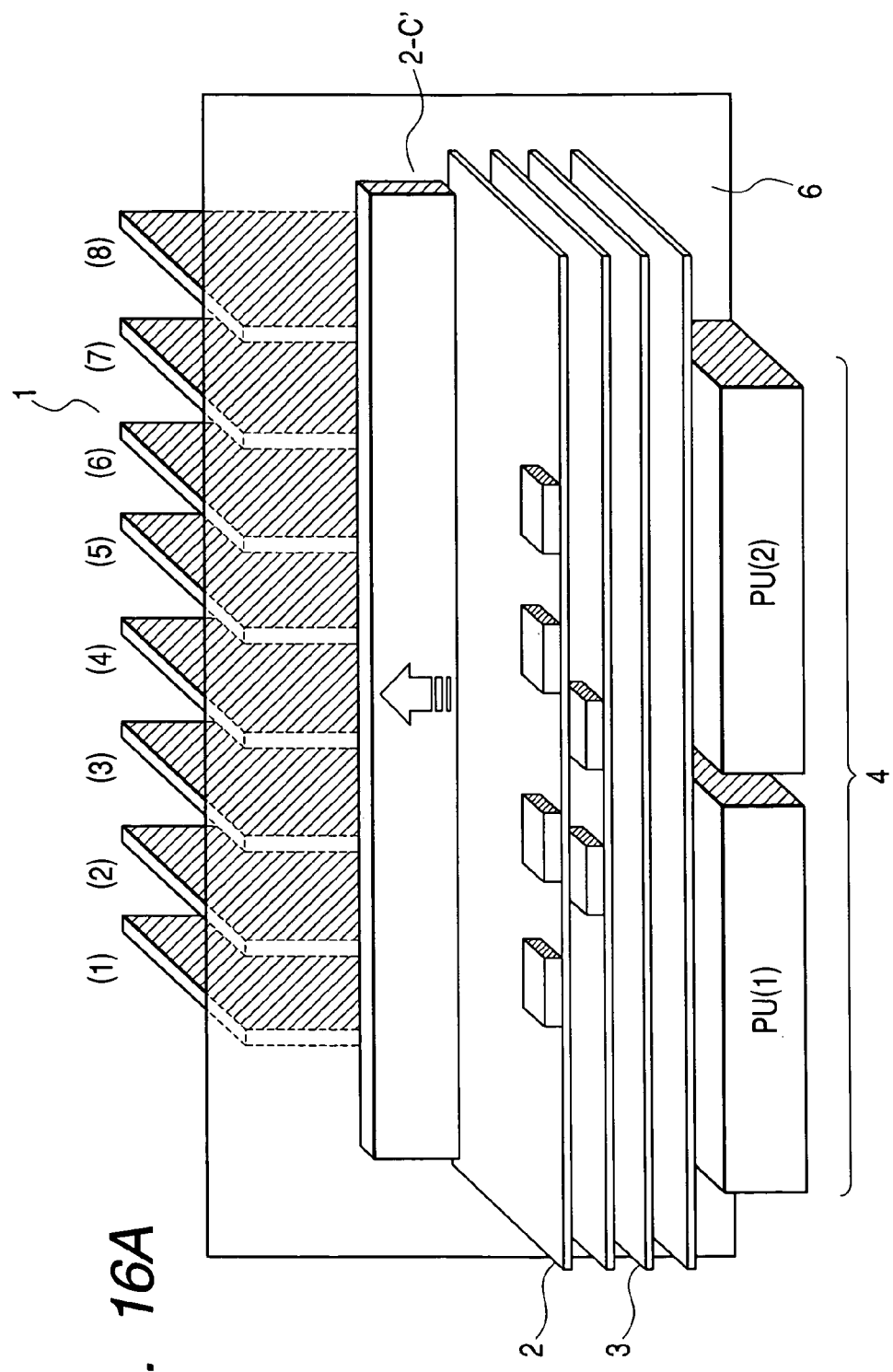
FIGS. 16A and 16B are drawings showing an example of the expansion of the blade server.
Figure 16B:
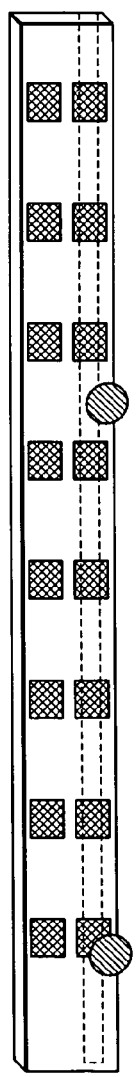

Subsequently, FIGS. 16A and 16B are drawings for describing a method of the expansion of the blade server with the functional expansion of the processor blade 1.

There are two possibilities as a method for matching an increase in the number of expansion interface PCI expresses 201 resulting from a fast processor that an interface unit is extended or a signal rate (band) between the interface unit and a processor blade is expanded. When the interface unit is extended, a new interface unit is mounted in the unoccupied connector among the connectors 902-1-c to 902-N-c on the interconnecting unit 6.

For a PCI express, a signal rate (band) can be expanded by increasing the number of signals. When the number of signals is increased, as shown in FIG. 16A, an interface whose band is expanded can be obtained by replacing the connector 2-c of the interface unit 2 with a new connector 2-c' stretched lengthwise. Further, the connector 2-c' is connected to the adjoining multiple connectors in the connectors 902-1-c to 902-m-c. FIG. 16B is a drawing of the connector 2-c' viewed from the front side. In an example of the connector of FIG. 16B, terminals for two columns of the connector described in FIG. 12 are provided.

Subsequently, a system in which the processor blade 1 that differs in height is coexistently mounted is described with reference with FIG. 17A. To increase the expansion interface PC express 201 of the processor blade 1, the lengthwise size of the processor blade 1 must be increased in some cases. When a blade that is small in the number of serial interfaces and small in size is mounted in an enclosure that accommodates a blade that is large in the number of serial interfaces and large in size like this, a mount kit 1503 for adjusting the size is used.

Figure 17A:
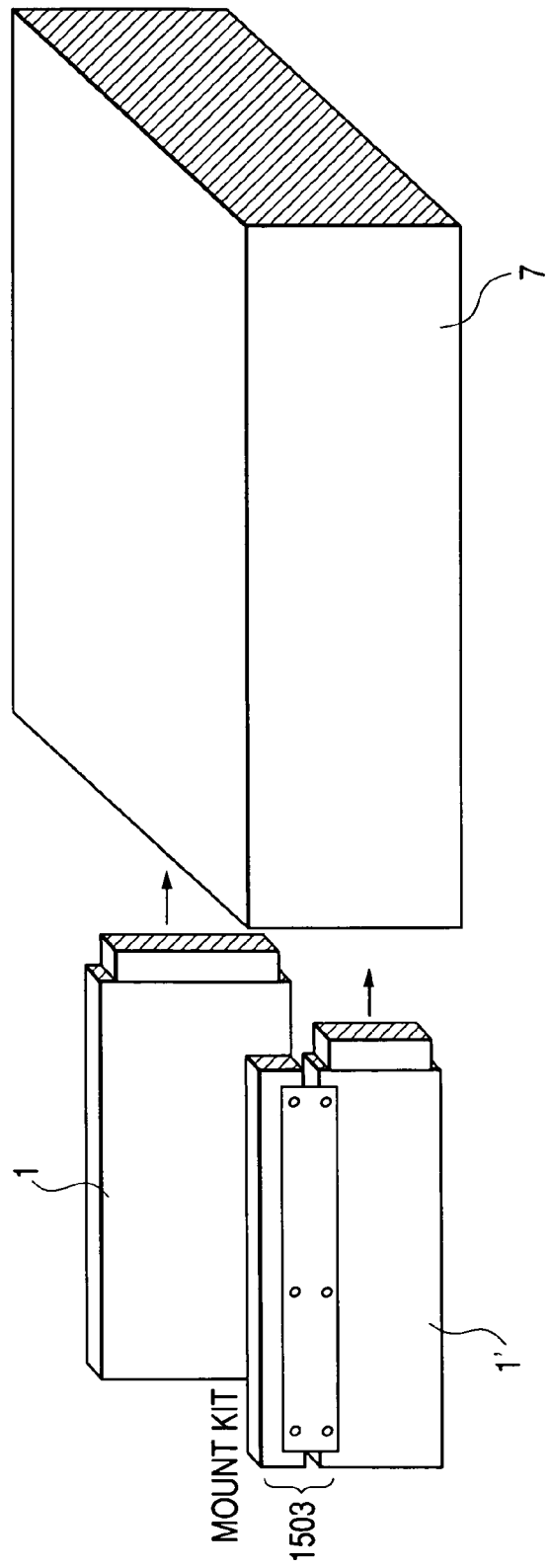
FIGS. 17A and 17B are drawings showing another example of the expansion of the blade server.
Figure 17B:
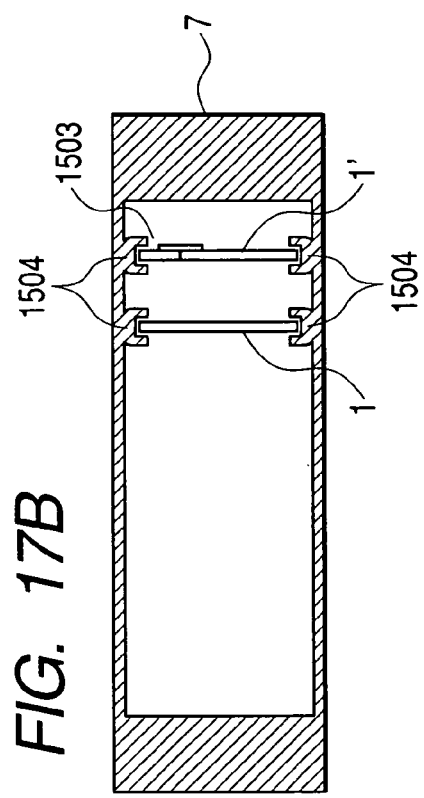

FIGS. 17A and 17B are drawings showing a method for mounting a processor blade 1' having a few expansion interface PCI expresses 201 in a blade server that mounts a processor blade 1 having more expansion interface PCI expresses 201 as a standard. FIG. 17A is a perspective view for mounting the low processor blade 1' in the enclosure 7. FIG. 17B is a front view for mounting the processor blade 1' in the enclosure 7.

As shown in FIG. 17B, if the mount kit 1503 is mounted in the processor blade 1' and the height of the processor blade 1' is made equal to the height of the processor blade 1, the mount kit can be inserted into a mounting rail 1504 installed in the enclosure 7 for a blade of a standard size, thereby enabling the mounting of the processor blade 1'. The processor blade 1' can be mounted if a mount kit for adjusting size is used in even simultaneously expanded enclosure because the wiring of each unit is common. Conversely, even when the processor blade 1' that is small in the extended interface PCI expresses 201 is used as a standard, the processor blade 1 in which the PCI express 201 is increased will perhaps be mounted after it is operating. Even in such a case, if the processor blade 1' is mounted in the enclosure 7 of large size from the beginning using the mount kit 1503, a measure for the increase of the PCI express can be taken.

As described above, according to the present invention, the number of serial interfaces can be increased and decreased in accordance with the functional performance of a server unit, that is, a processor blade. A band is expanded by extending even an interface in accordance with the number of serial interfaces of the processor blade or increasing the number of serial interfaces to be accommodated. Accordingly, matching with the applications of various blade servers is excellent.

Further, because the wiring between the interface unit 2, the managing unit 3, and the power unit 4 is a common bus line, the number of accommodated interface units 2 can be expanded by extending the bus wiring. Even a simultaneously expanded enclosure can be mounted only by using a mount kit that adjusts size because the wiring of each unit is common.

Further, even a processor blade that differs in performance and the number of serial interfaces can be loaded together because the wiring with a common unit is common.

Further, because an interface unit has a network protocol processing unit, the throughput of a processor blade is not suppressed.

Moreover, because transparent space can be provided on the front and back sides of an interconnecting unit, air cooling is effective as a cooling method when it is used.

The server system described above has the following aspects. First, a server device accommodates multiple server units that function as each server, a power unit shared by the multiple server units, a network interface, and a control monitoring function in a common enclosure. The server device can mount multiple network interfaces that correspond to the performance and functions of the multiple server units in the enclosure as the network interface of the common unit. The server device is provided with a serial interface that can have multiple interface signals that correspond to the performance and functions of the multiple server units.

A server unit of a server device is composed of a blade in which a processor for functioning as a server is mounted, for example. This server unit has multiple serial interfaces, and can increase the number corresponding to performance and functions.

Further, this server unit has a means of being able to enlarge an interface band by bundling multiple serial interfaces to be possessed and using them as an interface. This serial interface line can be connected and wired back to back using a connector of an interface unit connected to a network, such as the Internet or LAN of a common unit.

A network interface as a common unit for multiple server units is connected to a network. This network interface can extend the number of mounted interfaces in an enclosure to match the number of serial interfaces of the blade in which a processor is mounted. Otherwise, the network interface can increase the number of serial interfaces.

The control monitoring function as a common unit can monitor mounting states, operating states, and the presence of faults of multiple server units and an interface unit.

Network protocol processing is not performed in a blade, but this protocol processing can be performed in a network interface unit.

The wiring between a power unit of a common unit and a managing unit that monitors, controls or sets the operation of each unit inside a blade server, and between the power unit of the common unit and a network interface can be performed on a PC board as common bus wiring.

When a blade that is small in the number of serial interfaces and small in size is mounted in an enclosure that accommodates a blade that is large in the number of serial interfaces and large in size, a mount kit for adjusting the size can be used.

The wiring between with a power unit or a managing unit, and a blade that are common components can be connected back to back using a connector.

A connecting connector that applies wiring between a common part and a blade can provide space that makes the front and back sides of an enclosure transparent as a grid form.

According to another characteristic of the present invention, a server device has multiple server units that function as each server and a serial interface in which a power unit shared by the multiple server units, a network interface unit, and a control monitoring function unit are accommodated in a common enclosure. The server device can mount a server unit that differs in functions or performance in the enclosure as the multiple server units. The server device can increase and decrease the number of serial interfaces in accordance with the functions or performance of the multiple server units. The server device can mount multiple network interfaces unit in the enclosure corresponding to the serial interface.

Multiple server units can mount a processor blade lengthwise from the front side of an enclosure sandwiching an interconnecting unit. They can mount a power unit, a network interface, and a control monitoring function unit crosswise from the back side of the enclosure, and can also arrange a cooling unit on the enclosure side.

Accordingly, the configuration and packaging technology of a server device excellent in upper compatibility that can be used even if an old device coexists with a new device can be provided. Further, the configuration and packaging technology of an air cooling type server device that can cool high-density packaged equipment can be provided.

While the foregoing has described what are considered to be the best mode and/or other examples, it is understood that various modifications may be made therein and that the invention or inventions disclosed herein may be implemented in various forms and been described herein. It is intended by the following claims to claim any and all modifications and variations that fall within the true scope of the inventive concepts.

What is claimed is:

1. A server system, comprising:
   a blade, comprising,
      a chip set;
      a first processor connected to the chip set;
      a memory connected to the chip set;
      a first interface that outputs a processing signal of the first processor as a serial signal transmitted via the chip set and has a plurality of first serial interfaces; and
      a plurality of first connectors that output a signal from the first interface and each of the first connectors being connected with each of the first serial interfaces,
   a plurality of interface units, comprising,
      a second interface that sends and receives the serial signal and has a plurality of second serial interfaces;
      a protocol management unit that accepts a signal from a switch or the second interface and converts the signal according to protocol, then outputs the signal to an external device via a switch or the second interface; and
      a plurality of second connectors that output the signal from the second interface and each of the second connectors being connected with each of the second serial interfaces,
   a connection unit, the connection unit comprising,
      a plurality of third connectors that is mounted on a first side of the connection unit, and connected to the first connector; and
      a plurality of fourth connectors that is mounted on a second side that is a back side of the first side, and connected to the second connector,
   wherein, when a broadband interface unit is used,
   the first interface secures a first transmission line which is constituted by bundling at least two or more of the plurality of the first serial interfaces,
   the blade transmits the serial signal using the first transmission line, at least two of the first connectors which correspond to the bundled first serial interfaces, and the third connectors connected to the first connectors,
   the second interface secures a second transmission line which is constituted by bundling at least two or more of the plurality of the second serial interfaces,
   wherein, one of the plurality of interface units receives the serial signal transmitted from the first transmission line, using the second transmission line, at least two of the second connectors which correspond to the bundled second serial interfaces, and the fourth connectors connected to the second connectors, and
   wherein a bandwidth of the second transmission line is scalable depending on the protocol management unit that connects to the external device.

2. A server system according to claim 1, further comprising:
   a managing unit, the managing unit comprising,
      a first bus controller; and
      a second processor that processes the signal input from the first bus controller, and manages the states of the blade and the interface unit,
   wherein the blade and the interface unit each comprises a manager that detects the state of a local unit, and a second bus controller that outputs the information the manager detected, and
      wherein the connection unit comprises a bus that is connected to the first and second bus controllers, and transmits the signal output from the second bus controller.

3. A server system according to claim 2, wherein the connection unit further comprises a fifth connector that connects the managing unit, and the fifth connector is mounted on the second side.

4. A server system according to claim 1, wherein the serial signal is PCI express.

5. A server system according to claim 1, wherein the user interface is a third processor that processes the input signal according to TCP/IP.

6. A server system according to claim 1,
wherein the connection unit has a plurality of connectors, and a signal line for performing a serial transmission is connected to each of the plurality of connectors respectively.

7. A server system according to claim 1, wherein the plurality of third connectors and fourth connectors are arranged in a plurality of rows and a plurality of columns on the connection unit.

8. A server system comprising:
at least one processor blade, the processor blade comprising,
a chip set;
a first processor connecting to the chip set;
a memory connection to the chip set;
a first interface that is a serial interface outputs a processing signal of the first processor as a serial signal being transmitted via the chip set and has a plurality of first serial interfaces,
a plurality of interface units that output the signal output from the processor blade to an external device, the interface unit comprising:
a second interface that receives the signal from the processor blade and has a plurality of second serial interfaces;
a connector unit, the connector unit comprising, a plurality of first connectors for the allowable number of processor blades that mounts the processor blade and each of the first connectors being connected with each of the first serial interfaces, and
a plurality of second connectors for the allowable number of interface units that mounts the interface unit and each of the first connectors being connected with each of the first serial interfaces,
a plurality of third connectors that is mounted on a first side of the connection unit, and connected to the first connector; and
a plurality of fourth connectors that is mounted on a second side that is the back side of the first side, and connected to the second connector,
wherein the arrangement of the first connector and the arrangement of the second connector are intersected and connected each other,
wherein, when a broadband interface unit is used,
the first interface secures a first transmission line which is constituted by bundling at least two or more of the plurality of the first serial interfaces,
the processor blade transmits the serial signal using the first transmission line, at least two of the first connectors which correspond to the bundled first serial interfaces, and the third connectors connected to the first connectors,
the second interface secures a second transmission line which is constituted by bundling at least two or more of the plurality of the second serial interfaces,
wherein, the interface unit receives the serial signal transmitted from the first transmission line, using the second transmission line, at least two of the second connectors which correspond to the bundled second serial interfaces, and the fourth connectors connected to the second connectors, and
wherein a bandwidth of the second transmission line is scalable depending on the protocol management unit that connects to the external device.

9. A server system according to claim 8, wherein the connector unit comprises a
first unit that installs the first connector and a second unit that installs the second connector, and
a third connector hat connects the reverse side that mounts the processor blade of the first unit and the reverse side that mounts the interface unit of the second unit.

10. A server system according to claim 9, wherein the first unit is a frame that supports the plural first connectors.

11. A server system according to claim 9, wherein the second unit is a frame that supports the plural second connectors.

12. A server system according to claim 8, further comprising:
a managing unit, the managing unit comprising,
a first bus controller; and
a second processor that processes the signal input from the first bus controller, and manages the states of the processor blade and the interface unit,
wherein the processor blade comprises a manager that detects the state of a local unit, and a second bus controller that outputs the information detected by the manager, and
wherein the connection unit comprises a bus that is connected to the first and second bus controllers and transmits the signal output from the second bus controller.

13. A server system according to claim 12, wherein the connector unit comprises a plate on which the second connector is mounted and the bus is wired, and
a fourth connector that is installed on the bus and on which the managing unit is mounted.

14. A server system according to claim 13, wherein the plate comprises a frame that supports the second connector, and is hollow except the frame and a part on which the bus is wired.

15. A server system according to claim 13, wherein the fourth connector and the plural second connectors are arranged in parallel.

16. A server system according to claim 8, further comprising:
a casing in which the processor blade, the interface unit, and the connector unit are housed, and
a mount kit of the processor blade,
wherein the mount kit mounts the processor blade and height is complemented if the width of the processor blade is smaller than the width of the casing.

17. A server system according to claim 8, wherein a plurality of the signal output lines of the first serial interface are connected in one connection side of the first connector and the second connector.

18. A server system according to claim 8, wherein a part of the plurality of the signal output lines of the first serial interface are connected in the one connection side of the first connector and the second connector.

19. A server system according to claim 8, wherein the connection unit has a plurality of connectors, and a signal line for performing a serial transmission is connected to each of the plurality of connectors respectively.

20. A server system, comprising:
a plurality of server units that function as each server;
a power unit shared by the plurality of server units;
a network interface; and
a control monitoring function, wherein the network interface includes a plurality of interface units that output the signal output from the plurality of server unit to an external device, wherein the plurality of server units, the power unit, the network interface and the control monitoring function are connected by a connection unit and accommodated in a common enclosure, wherein each of the server units comprises at least one blade and a first interface that is connected to the blade and has a plurality of first serial interfaces, wherein the blade comprises a chip set, a first processor connecting to the chip set, and a memory connected to the chip set, wherein the first interface outputs a processing signal of the first processor as a serial signal being transmitted via the chip set, wherein the interface unit comprises a user interface electrically connected to external equipments, a switch connected to the user interface, a protocol processing unit connected to the switch, and a second interface connected to the protocol processing unit and has a plurality of second serial interfaces, the server system further comprising:

a plurality of first connectors that outputs a signal from the first interface and each of the first connectors being connected with each of the first serial interfaces, a plurality of second connectors that outputs the signal from the second interface and each of the second connectors being connected with each of the second serial interfaces, wherein the connection unit comprises;

a plurality of third connectors that is mounted on a first side of the connection unit, and connected to the first connector; and a plurality of fourth connectors that is mounted on a second side that is the back side of the first side, and connected to the second connector, wherein, when a broadband interface unit is used, the first interface secures a first transmission line which is constituted by bundling at least two or more of the plurality of the first serial interfaces, the blade transmits the serial signal using the first transmission line, at least two of the first connectors which corresponds to the bundled first serial interfaces, and the third connectors connected to the first connectors, the second interface secures a second transmission line which is constituted by bundling at least two or more of the plurality of the second serial interfaces, wherein, the interface unit receives the serial signal transmitted from the first transmission line, using the second transmission line, at least two of the second connectors which corresponds to the bundled second serial interfaces, and the fourth connectors connected to the second connectors, wherein a signal input from any one of said external equipments undergoes protocol processing at the protocol processing unit and the processed signal is input to the any one of said server units, and wherein a signal output from any one of said server units undergoes protocol processing at the protocol processing unit and the processed signal is output to any one of said external equipments, and wherein a bandwidth of the second transmission line is scalable depending on the protocol management unit that connects to the external device.

21. A server system according to claim 20, wherein, when a signal is input from the external equipments, the switch outputs the signal input through the user interface from the external equipments to the protocol processing unit, the protocol processing unit performs a protocol processing to the signal output from the switch and outputs it to the second interface, the second interface outputs the signal carried out from the protocol processing to the first interface connected through the connection unit, and the first interface outputs the signal output from the second interface to the blade, and wherein, when a signal is outputted to the external equipments, the blade outputs a signal to the first interface, the first interface outputs the signal outputted from the blade to the second interface connected through the connection unit, the second interface outputs the signal outputted from the first interface to the protocol processing unit, the protocol processing unit performs a protocol processing to the signal output from the second interface and outputs it to the switch, and the switch outputs the signal carried out the protocol processing to the external equipments.

22. A server system according to claim 20, wherein said multiple server units are capable of mounting on the enclosure lengthwise from the front side of an enclosure sandwiching the connection unit, wherein the power supply, the network interface and the control monitoring unit are constituted as capable of mounting on the enclosure crosswise from the back side of the enclosure, wherein the wiring between with the power unit or the control monitoring unit, and said multiple server units are common components capable of connecting directly using the connectors, wherein the wiring between the power unit, the network interface, and the control monitoring unit shared by said multiple server units is a common bus line on a PC board, wherein the network interface and multiple interface signals of said multiple server units are capable of connecting directly using the connectors.

23. A server system according to claim 22, wherein the PC board disposed in the back side of the enclosure is formed only on the lower side and both sides of a wiring area and whose central part is hollowed whereby air on the front and back sides can blow through.

24. A server system according to claim 20, wherein said multiple server units differ in the number of serial interfaces and size, and are capable of mounting in the enclosure using a mount kit for adjusting the size.

25. A server system according to claim 20, wherein said multiple server units differs in the number of serial interfaces are capable of mounting in the enclosure together.

26. A server system according to claim 1, further comprising: a managing unit, the managing unit comprising, a first bus controller; and a second processor that processes the signal input from the first bus controller, and manages the states of the blade and the interface unit, wherein the blade and the interface unit each comprises a manager that detects the state of a local unit, and a second bus controller that outputs the information the manager detected, and wherein the connection unit comprises a bus that is connected to the first and second bus controllers, and transmits the signal output from the second bus controller, and wherein the connection unit further comprises a fifth connector that connects the managing unit, and the fifth connector is mounted on the first side.

27. A server system according to claim 26, wherein at least one additional interface unit and the plurality of interface units are connected to the fourth connectors and mounted on the second side.

* * * * *